(12) United States Patent
Kim et al.

(10) Patent No.: US 12,307,009 B2
(45) Date of Patent: May 20, 2025

(54) ELECTRONIC DEVICE COMPRISING DISPLAY AND METHOD THEREOF

(71) Applicant: Samsung Electronics Co., Ltd., Suwon-si (KR)

(72) Inventors: Kyuwon Kim, Suwon-si (KR); Hyungsuk Kim, Suwon-si (KR); Heekuk Lee, Suwon-si (KR); Inho Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/414,824

(22) Filed: Jan. 17, 2024

(65) Prior Publication Data

US 2024/0152206 A1 May 9, 2024

Related U.S. Application Data

(63) Continuation of application No. PCT/KR2022/002945, filed on Mar. 2, 2022.

(30) Foreign Application Priority Data

Jul. 22, 2021 (KR) .................. 10-2021-0096407

(51) Int. Cl.
*G06F 3/01* (2006.01)
*G06T 7/12* (2017.01)
(Continued)

(52) U.S. Cl.
CPC ............... *G06F 3/013* (2013.01); *G06T 7/12* (2017.01); *G06T 7/246* (2017.01); *G06T 7/73* (2017.01);
(Continued)

(58) Field of Classification Search
CPC . G06F 3/013; G06T 7/12; G06T 7/246; G06T 7/173; G06T 2207/10024;
(Continued)

(56) References Cited

U.S. PATENT DOCUMENTS

| 10,360,876 B1 | 7/2019 | Rahman |
| 2010/0007796 A1 | 1/2010 | Kobayashi |

(Continued)

FOREIGN PATENT DOCUMENTS

| EP | 2894557 | 7/2015 |
| JP | 2012520018 A | 8/2012 |

(Continued)

OTHER PUBLICATIONS

Lee et al., Content Moving System for Digital Signage, Electronics and Telecommunications Research Institute, pp. 1016-1017, 2015.
(Continued)

*Primary Examiner* — Robert J Michaud
(74) *Attorney, Agent, or Firm* — Nixon & Vanderhye P.C.

(57) ABSTRACT

An electronic device according to various embodiments of the present disclosure may comprise: a housing, a display, a camera sensor, a wireless communication circuit, and at least one processor, comprising processing circuitry, electrically connected to the display, the camera sensor, and the wireless communication circuit, wherein at least one processor, individually and/or collectively, is configured to control the electronic device to: recognize a first object and a second object through at least one of the camera sensor and the wireless communication circuit; determine a first coordinate value on the display, corresponding to the first object, and a second coordinate value on the display, corresponding to the second object; determine a first region of the display based on the first coordinate value; determine a second region of the display based on the second coordinate value; output a first content corresponding to the first object on the first region; output a second content corresponding to the second object on the second region; and based on the distance between the first coordinate value and the second coordinate value being within a specified range, arrange the first content (Continued)

and the second content in the vertical direction of the display.

17 Claims, 10 Drawing Sheets

(51) Int. Cl.
    *G06T 7/246*     (2017.01)
    *G06T 7/73*     (2017.01)
    *G06V 20/50*     (2022.01)
    *G06V 40/10*     (2022.01)
    *G06Q 30/0241*     (2023.01)

(52) U.S. Cl.
    CPC ............. *G06V 20/50* (2022.01); *G06V 40/10* (2022.01); *G06Q 30/0277* (2013.01); *G06T 2207/10024* (2013.01); *G06T 2207/10028* (2013.01); *G06T 2207/30196* (2013.01)

(58) Field of Classification Search
    CPC ........... G06T 2207/10028; G06T 2207/30196; G06V 40/10; G06V 20/50; G06Q 30/0277
    See application file for complete search history.

(56) References Cited

U.S. PATENT DOCUMENTS

| | | |
|---|---|---|
| 2013/0286046 A1 | 10/2013 | Rodriguez |
| 2015/0199089 A1* | 7/2015 | Lee ....................... G06F 3/0482 715/716 |
| 2016/0345124 A1 | 11/2016 | Ahn |
| 2018/0158244 A1* | 6/2018 | Ybanez Zepeda ...... G06F 3/038 |
| 2021/0044795 A1 | 2/2021 | Karafin et al. |
| 2021/0173604 A1 | 6/2021 | Park |
| 2022/0350470 A1* | 11/2022 | Su .......................... G06V 40/16 |
| 2023/0001923 A1* | 1/2023 | Prasad Challa .............................. B60W 30/18109 |

FOREIGN PATENT DOCUMENTS

| | | |
|---|---|---|
| JP | 5391951 B2 | 10/2013 |
| JP | 5797549 B2 | 8/2015 |
| JP | 2020134640 A | 8/2020 |
| KR | 101274362 B1 | 6/2013 |
| KR | 20150084302 A | 7/2015 |
| KR | 20150085400 A | 7/2015 |
| KR | 20160066286 A | 6/2016 |
| KR | 10-2016-0107059 | 9/2016 |
| KR | 20170055887 A | 5/2017 |
| KR | 101824973 B1 | 3/2018 |
| KR | 101835363 B1 | 3/2018 |
| KR | 101852339 B1 | 4/2018 |
| KR | 20180096418 A | 8/2018 |
| KR | 20210071351 A | 6/2021 |

OTHER PUBLICATIONS

International Search Report for PCT/KR2022/002945 mailed Jun. 17, 2022, 5 pages.
Written Opinion of the ISA for PCT/KR2022/002945 mailed Jun. 17, 2022, 4 pages.
Extended European Search Report dated May 22, 2024 issued in European Patent Application No. EP22845991.3.

* cited by examiner

ELECTRONIC DEVICE COMPRISING DISPLAY AND METHOD THEREOF

CROSS-REFERENCE TO RELATED APPLICATIONS

This application is a continuation of International Application No. PCT/KR2022/002945 designating the United States, filed on Mar. 2, 2022, in the Korean Intellectual Property Receiving Office and claiming priority to Korean Patent Application No. 10-2021-0096407, filed on Jul. 22, 2021, in the Korean Intellectual Property Office, the disclosures of each of which are incorporated by reference herein in their entireties.

BACKGROUND

Field

The disclosure relates to an electronic device including a display and a method thereof.

Description of Related Art

Digital signage may refer to a device that displays various contents such as a text and a video on a display screen in public or commercial places, and is used for advertising or promotional purposes.

Also, to reduce a visual blind spot, the digital signage is developing into a form equipped with not only a flat display but also a polyhedral display capable of outputting content at various angles, such as a square pillar or cylindrical form.

Also, to maximize or increase an advertising effect through the digital signage equipped with the displays of various forms as above, a target advertisement technology of recognizing pedestrians who move through a place around the digital signage and displaying advertisements suitable for the pedestrians can be utilized.

When the pedestrian moves in the process of displaying a target advertisement to the pedestrian through one digital signage, advertisements can be continuously presented along a pedestrian's path to present continuous advertisements to the moving pedestrian. Accordingly, respective pedestrians who move in different directions can be presented with target advertisements which move along movement paths of respective pedestrians at different angles through one digital signage. In this process, when the movement paths of the pedestrians who move in different directions are partially overlapped, respective target advertisements are overlapped and arranged in the same region of a display, so there is a problem that it is difficult to present visually continuous advertisements to the pedestrians.

SUMMARY

An electronic device according to various example embodiments of the present disclosure may include: a housing, a display, a camera sensor, a wireless communication circuit, and at least one processor, comprising processing circuitry, electrically connected to the display, the camera sensor, and the wireless communication circuit. At least one processor, individually and/or collectively be configured to: recognize a first object and a second object through at least one of the camera sensor and the wireless communication circuit, determine a first coordinate value on the display corresponding to the first object and a second coordinate value on the display corresponding to the second object, determine a first region of the display, based on the first coordinate value, determine a second region of the display, based on the second coordinate value, output a first content corresponding to the first object on the first region, output a second content corresponding to the second object on the second region, and based on a distance between the first coordinate value and the second coordinate value being within a specified range, arrange the first content and the second content in a vertical direction of the display.

According to an example embodiment, a method of operating an electronic device including a display and a camera sensor may include: recognizing a first object and a second object through the camera sensor, determining a first coordinate value on the display corresponding to the first object and a second coordinate value on the display corresponding to the second object, determining a first region of the display, based on the first coordinate value, determining a second region of the display, based on the second coordinate value, outputting a first content corresponding to the first object on the first region, outputting a second content corresponding to the second object on the second region, and based on the distance between the first coordinate value and the second coordinate value being within a specified range, arranging the first content and the second content in a vertical direction of the display.

According to various example embodiments, even if movement paths of pedestrians who move in various directions are partially overlapped, an electronic device may present visually continuous content to the respective pedestrians.

In addition, various effects directly or indirectly identified through the present disclosure may be presented.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
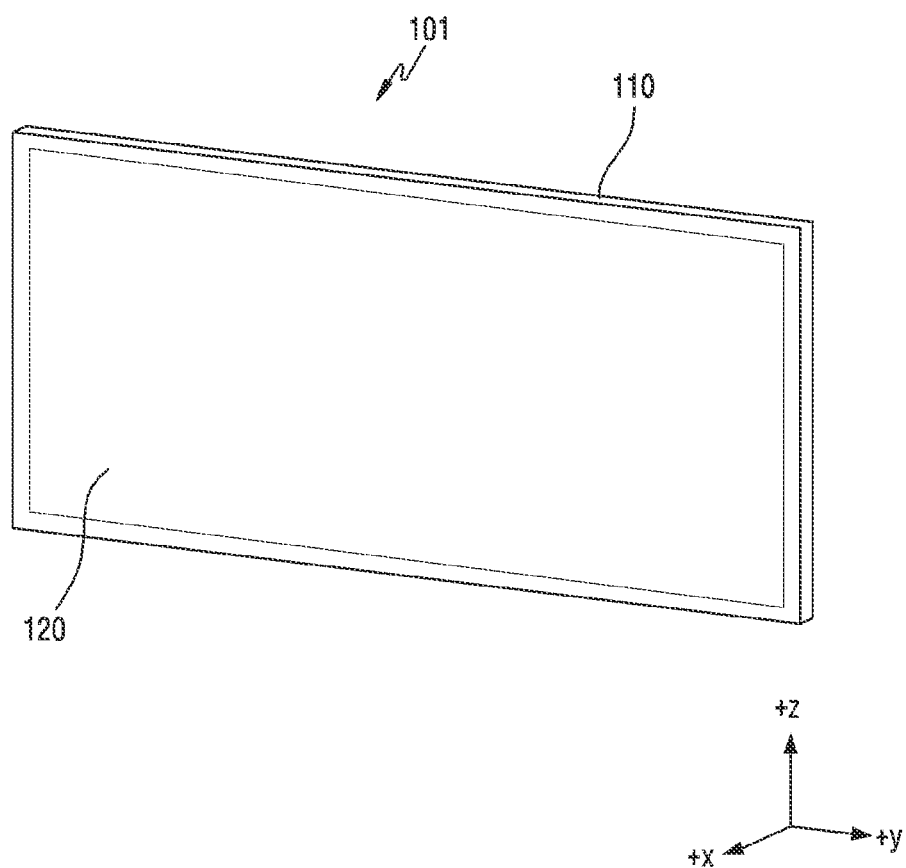
FIG. 1 is a front perspective view of an electronic device according to various embodiments.

FIG. 1 is a front perspective view of an electronic device 101 according to various embodiments.

The electronic device 101 of an embodiment may include a housing 110 and a display 120.

The electronic device 101 of an embodiment may include an analog TV, a digital TV, a 3D-TV, a smart TV, a light emitting diode (LED) TV, an organic light emitting diode (OLED) TV, a plasma TV, a quantum dot TV, and/or a monitor, but is not limited.

In an embodiment, the electronic device 101 may include a digital signage device. Digital signage may perform an outdoor advertising function that uses a digital information display (DID). Digital signage may function as various billboards such as posters, bulletin boards, and signs, so it may refer to a digital bulletin board that presents advertisements through digital displays.

In an embodiment, the electronic device 101 may include the housing 110. In an example, the housing 110 may form the exterior of the electronic device 101 while protecting various electronic components. In an example, the housing 110 may include a first surface facing a first direction (e.g., +x direction in FIG. 1) and a second surface facing a direction opposite to the first surface. In an example, the first surface may be an outer surface of the electronic device 101, and the second surface may be an inner surface of the electronic device 101.

In an embodiment, the electronic device 101 may include the display 120. In an example, the display 120 may be visible to the outside through at least one surface of the housing 110. For example, the display 120 may be arranged on the first surface of the housing 110. The housing 110 may include a recess for accommodating the display 120.

In an embodiment, the display 120 may refer to a display in which at least some regions may be transformed into a flat surface or a curved surface. For example, the display 120 may include a display with a flat screen, a display with a fixed curvature, a display with multiple curvatures, a flexible display, or a display whose curvature may be changed by an input, e.g., a user input. The display 120 may extend in a height direction, e.g., so that different contents may be displayed at different heights, e.g., different height positions relative to a surface upon which a pedestrian stands.

In an embodiment, the display 120 may be combined with or arranged adjacent to a touch detection circuit, a pressure sensor capable of measuring the intensity (pressure) of touch, and/or a digitizer detecting a magnetic field-type stylus pen. In an example, the edge of the display 120 may be formed to be substantially the same as an adjacent outer shape (e.g., curved surface) of the housing 110.

The structure of the electronic device 101 described above is merely illustrative, and embodiments of the present disclosure are not limited thereto. For example, the housing 110 of the electronic device 101 may include various shapes such as a bar shape, a tripod shape including a plurality of bar shapes, or a quadruped shape.

Figure 2:
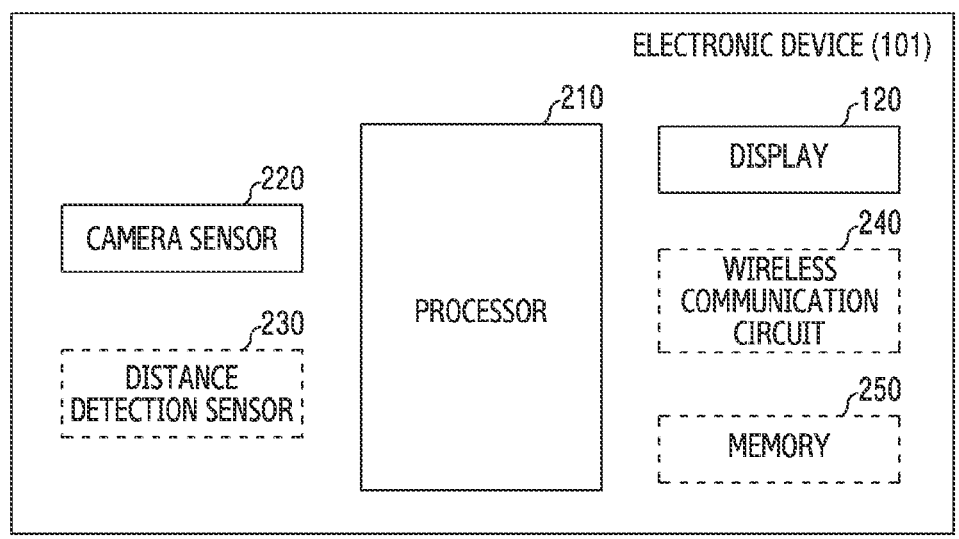
FIG. 2 is a block diagram illustrating an example configuration of an electronic device according to various embodiments.

FIG. 2 is a block diagram illustrating an example configuration of an electronic device 101 according to various embodiments.

In an embodiment, the electronic device 101 may include a display 120, a camera sensor 220, a wireless communication circuit 240, and a processor (e.g., including processing circuitry) 210. In an example, components of the electronic device 101 shown in FIG. 2 may be replaced with other components or additional components may be included in the electronic device 101. For example, the electronic device 101 may further include at least one of a distance detection sensor 230 and/or a memory 250.

In an embodiment, the processor 210 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions. The processor 210 may be electrically connected to at least one of the display 120, the camera sensor 220, the distance detection sensor 230, the wireless communication circuit 240, and/or the memory 250.

In an embodiment, the processor 210 may execute one or more instructions stored in the memory 250. In an example, the electronic device 101 may include a plurality of processors. The processor 210 may include at least one of a circuit for processing data, for example, an integrated circuit (IC), an arithmetic logic unit (ALU), a field programmable gate array (FPGA), or a large scale integration (LSI).

In an embodiment, the display 120 may visually output information to a user through the display 120 that is based on at least one of an organic light emitting diode (OLED), a liquid crystal display (LCD), and a light emitting diode (LED), but is not limited thereto. In order to more intuitively control a user interface (UI) output through the display 120, the electronic device 101 may include a touch screen panel (TSP) (not shown) arranged on the display 120. The touch screen panel may detect the position of an object (for example, a user's finger or a stylus pen) that touches the display 120 or hovers above the display 120, using at least one of a resistive film, capacitive components, a surface acoustic wave, and an infrared ray.

In an embodiment, the display 120 may output various contents through a screen region.

In an embodiment, content output through the display 120 may refer to digital content. In an example, the content may include image data. The image data may include a still image or a moving image. In another example, the content may include image data and audio data. The content may be distinguished by a content name. For example, a first content and a second content may correspond to content names.

In an embodiment, the display 120 may divide a region of the display 120 according to a set standard. In an example, the display 120 may visually output different information for each divided region of the display 120.

In an embodiment, the camera sensor 220 may include a sensor for recognizing objects. For example, the camera sensor 220 may include at least one camera sensor. The camera sensor may include an RGB sensor and/or a dynamic vision sensor (DVS).

In an embodiment, the RGB sensor may include a plurality of sensors that detect red, green, and/or blue. In an example, the electronic device 101 may acquire information about a subject (or object) through the RGB sensor. The processor 210 may determine the age or gender of the object through the information about the subject (or object).

In an embodiment, the dynamic vision sensor may include a sensor that transmits information about the movement of an object at a relatively high frame rate only when there is the movement of the object sensed.

In an embodiment, the camera sensor 220 may detect an object (or pedestrian) located in a place around the electronic device 101, and predict a distance to the detected object. In an example, the processor 210 may predict a 3D position of the object located in the place around the electronic device 101 through the camera sensor 220.

In an embodiment, the distance detection sensor 230 may include at least one sensor for detecting a distance. For example, the distance detection sensor 230 may include a millimeter wave radar (mmWave radar), a light detection and ranging (LiDAR) sensor, a direct time of flight (dToF) sensor, and/or a beacon.

In an embodiment, the processor 210 may include location information of an object through the distance detection sensor 230. The location information of the object may include information about a distance between the distance detection sensor 230 and the object, an angle, and/or a speed.

In an embodiment, the wireless communication circuit 240 (e.g., a communication module 1090 of FIG. 10) may support communication between external electronic devices (e.g., external devices (e.g., external devices 1004 of FIG. 10)). For example, the communication circuit 240 may establish wireless communication with the external electronic device according to a prescribed communication protocol, and transmit and receive signals or data using a frequency band supporting the wireless communication. The wireless communication may include at least one of ultra-wideband (UWB) communication, Wi-Fi communication, WiGig communication, Bluetooth (BT) communication, or Bluetooth low energy (BLE) communication.

In an embodiment, the processor 210 may establish wireless communication with a plurality of external electronic devices (e.g., electronic devices 1002 and 1004 of FIG. 10) through the wireless communication circuit 240. In an example, when the electronic device 101 is located within an effective range of signals transmitted by the plurality of external electronic devices, the processor 210 may receive a plurality of signals including data from the plurality of external electronic devices.

In an embodiment, the memory 250 may store data related to the electronic device 101. The memory 250 may include a volatile memory such as a random access memory (RAM) including a static random access memory (SRAM) or a dynamic random access memory (DRAM), or include a non-volatile memory such as not only a read only memory (ROM), a magnetoresistive RAM (MRAM), a spin-transfer torque MRAM (STT-MRAM), a phase-change RAM (PRAM), a resistive RAM (RRAM), and a ferroelectric RAM (FeRAM) but also a flash memory, an embedded multimedia card (eMMC), or a solid state drive (SSD), but is not limited.

In an embodiment, the memory 250 may store information for outputting through the display 120. For example, the memory 250 may store at least one piece of content to be output through the display 120 and/or data (e.g., metadata, file index) related to the content. The memory 250 may at least temporarily store data (e.g., sensing data), programs, and/or at least one instruction (e.g., an algorithm for object recognition) for controlling the electronic device 100 and performing various operations according to various embodiments of the present disclosure.

In an example, the wireless communication circuit 240 may receive information for outputting through the display 120 from an external device and/or server. The information received through the wireless communication circuit 240 may be stored in the memory 250. In an example, the information received from the external device and/or server may include at least one of information about advertising content (e.g., information about an advertised product), news, weather information, and traffic information.

Figure 3:
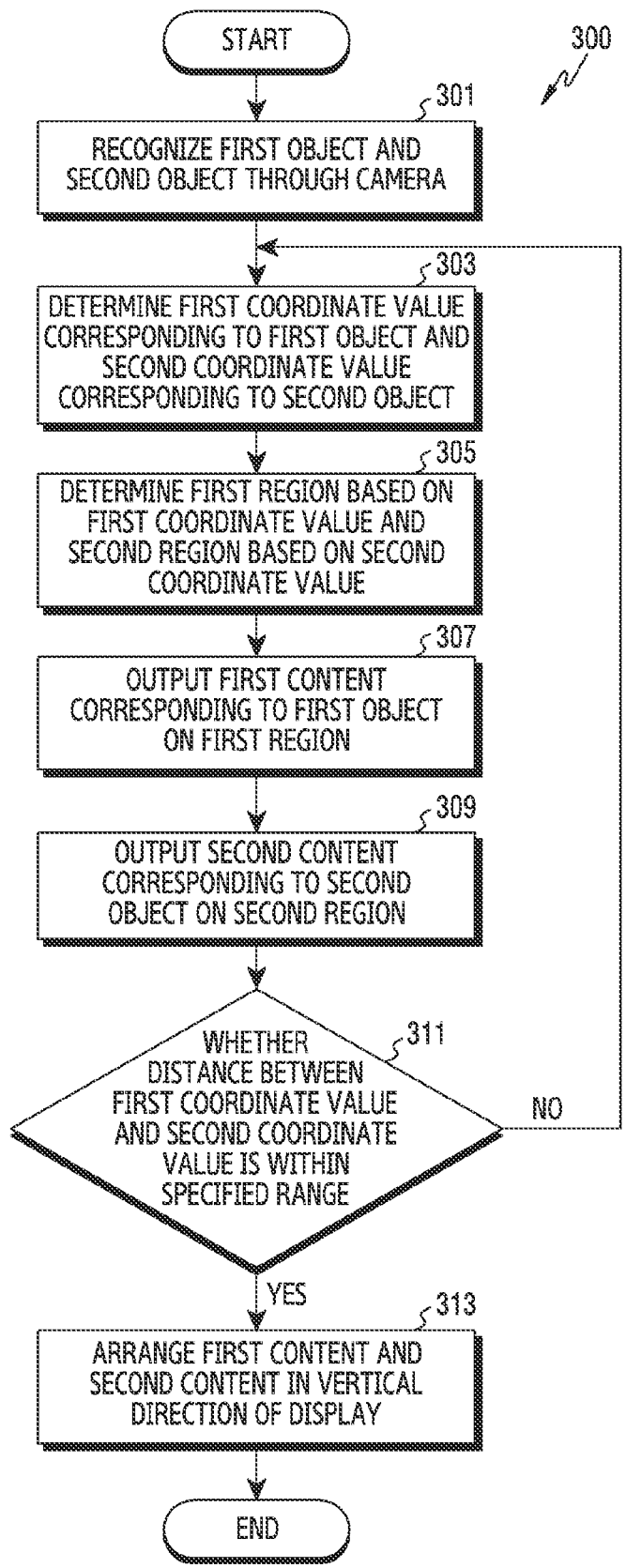
FIG. 3 is a flowchart illustrating an example operation of an electronic device that presents content, according to various embodiments.

FIG. 3 is a flowchart 300 illustrating an example method of operating an electronic device 101 presenting content, according to various embodiments.

Hereinafter, in an embodiment, each operation may be performed sequentially, but is not necessarily performed sequentially. For example, the order of each operation may be changed and at least two operations may be performed in parallel.

In operation 301, the electronic device 101 (e.g., the processor 210 of FIG. 2) of an embodiment may recognize at least one of a first object (e.g., a first object 450 of FIG. 4) or a second object (e.g., a second object 460 of FIG. 4) through at least one of the camera sensor 220 and the wireless communication circuit 240.

Hereinafter, at least one of the first object or the second object may correspond to a concept including one object or a group of a plurality of objects. In an example, the recognized first object and second object may include at least one feature of a person (e.g., a part of the body of the person).

In an embodiment, the first object or the second object may include an object within a predetermined distance from the electronic device 101. In an example, the first object and the second object may include an object within an angle of view of the camera sensor 220. In an example, the angle of view of the camera sensor 220 may be determined based on a lens included in the camera sensor 220. In another example, the first object and the second object may correspond to external electronic devices located within a place around the electronic device 101.

Hereinafter, an operation in which the processor 210 recognizes the first object and the second object through the camera sensor 220 will be described.

In an embodiment, the processor 210 may identify the first object and the second object through an object recognition algorithm stored in the memory 250 and sensing data acquired through the camera sensor 220.

In an embodiment, the processor 210 may acquire sensing data through the camera sensor 220. In an example, the sensing data acquired through the camera sensor 220 may include data about a place within a range of an angle of view of the camera sensor 220. In an example, the data about the place within the range of the angle of view of the camera sensor 220 may include data about a surrounding place where the electronic device 101 is arranged.

In an embodiment, the processor 210 may convert the data about the place within the range of the angle of view of the camera sensor 220 into data about a plurality of identification places. In an example, the data about the plurality of identification places may correspond to data dividing the place within the range of the angle of view of the camera sensor 220 so as to identify objects.

In an embodiment, the sensing data acquired through the camera sensor 220 may include information about a structure of a place where the electronic device 101 is located.

The information about the place where the electronic device 101 is located may include information about a distance to points within a structure and thing around the electronic device 101, and information about a structure (e.g., shape and/or size) around the electronic device 101 through the information about the distance.

In an embodiment, the processor 210 may identify objects located in the plurality of identification places through the sensing data acquired through the camera sensor 220 and the object recognition algorithm stored in the memory 250. For example, the plurality of identification places may include a first identification place and a second identification place. The processor 210 may identify an object located in the first identification place and/or an object located in the second identification place.

In an embodiment, the processor 210 may identify a plurality of objects located within any one identification place from a plurality of separated identification places. For example, the plurality of identification places may include a first identification place and a second identification place. In this case, the processor 210 may identify a plurality of objects existing in the first identification place among the plurality of identification places. The processor 210 may identify each object of the plurality of objects existing in the first identification place. The processor 210 may acquire information about an object typifying the plurality of objects arranged in the first identification place, based on a mean value of a distance value between each object and the electronic device 101, and the center of gravity of a total area of a region where each object is located. In an embodiment, when a plurality of objects are identified in one of the plurality of identification places, the processor 210 may identify the objects, based on the mean value of the distance value between each object and the electronic device 101, and the center of gravity of the total area of the region where each object is located. When the plurality of objects are identified within one of the plurality of identification places, the processor 210 may identify the plurality of objects as a group. For example, when the plurality of objects are identified within a first identification place among a plurality of identification places including the first identification place and a second identification place, the processor 210 may identify, as a first group, the electronic device 101 and the plurality of objects identified within the first identification place. The processor 210 may identify the first group as a first object, based on a mean value of a distance value between the plurality of objects identified in the first identification place and the electronic device 101, and the center of gravity of a total area of a place where the plurality of objects identified in the first identification place are located. In an example, when a plurality of objects are identified within a second identification place among a plurality of identification places including a first identification place and the second identification place, the processor 210 may identify, as a second group, the electronic device 101 and the plurality of objects identified within the second identification place. The processor 210 may identify the second group as a second object, based on a mean value of the distance value between the plurality of objects identified in the second identification place and the electronic device 101, and the center of gravity of a total area of a place where the plurality of objects identified in the second identification place are located.

In an embodiment, the processor 210 may identify a change of an angle of view of the camera sensor 220. In an example, when a location where the electronic device 101 is arranged is changed, the angle of view of the camera sensor 220 may be also changed. In another example, when a location of the camera sensor 220 changes, the angle of view of the camera sensor 220 may also change. In an example, when identifying the change of the angle of view of the camera sensor 220, the processor 210 may update the sensing data acquired through the camera sensor 220.

In an embodiment, the processor 210 may identify objects located in a plurality of changed identification places by utilizing the updated sensing data of the camera sensor 220 and the object recognition algorithm. For example, the plurality of changed identification places may include a third identification place and a fourth identification place that are distinct from the first identification place and the second identification place. In an example, the processor 210 may identify an object located in the third identification place and/or an object located in the fourth identification place.

Hereinafter, an operation in which the processor 210 recognizes the first object and the second object through the wireless communication circuit 240 will be described.

In an embodiment, the processor 210 may recognize the first object and the second object through the wireless communication circuit 240.

In an embodiment, by receiving a plurality of wireless signals from a plurality of external electronic devices being within an effective range of the electronic device 101 through the wireless communication circuit 240, the processor 210 may identify the plurality of external electronic devices corresponding to the plurality of wireless signals as a first object and/or a second object.

In an embodiment, the wireless communication circuit 240 may include a circuit for transmitting and receiving a wireless signal. In an example, the wireless communication circuit 240 may transmit and receive a wireless signal to and from an external electronic device (e.g., external devices 1002 and 1004 of FIG. 10). The external electronic device may include a device capable of transmitting a wireless signal to the electronic device 101.

In an embodiment, the wireless communication circuit 240 may perform wireless communication according to at least one communication standard. For example, the wireless communication circuit 240 may transmit and receive a wireless signal through at least one of wireless fidelity direct (Wi-Fi direct), infrared communication (IR), and Bluetooth.

In an embodiment, the processor 210 may receive a wireless signal from an external electronic device through the wireless communication circuit 240. In an example, the external electronic device may include a beacon device. The wireless signal may correspond to a beacon signal. In this case, when the electronic device 101 is located within an effective range of the beacon signal transmitted by the beacon device, the electronic device 101 may receive the beacon signal. The effective range may be about 50 m, but is not limited thereto and may be understood to include a technical range that may be understood by those skilled in the art.

In an embodiment, a plurality of external electronic devices may transmit a plurality of wireless signals to the electronic device 101 through various communication methods.

In an embodiment, the processor 210 may receive the plurality of wireless signals from the plurality of external electronic devices through the wireless communication circuit 240.

In an embodiment, the wireless signal received from the external electronic device may include unique information (identifier) of the external electronic device, information about a location of the external electronic device, and/or information about a strength of the wireless signal.

In an embodiment, the processor 210 may identify an object using map information stored in the memory 250 and a wireless signal received by the external electronic device acquired through the wireless communication circuit 240.

In an embodiment, the map information may include information about a plurality of identification places related to a place where the electronic device 101 is located. In an example, the map information may be stored in the memory 250, and may be provided by a program stored in memory 250. In an example, the information about the plurality of identification places related to the place where the electronic device 101 is located included in the map information may include a first identification place and a second identification place. In an example, respective identification places of the plurality of identification places may correspond to places distinct from each other.

In an embodiment, the processor 210 may identify the first object and the second object, based on the map information and the wireless signal received from the external electronic device. In an example, the processor 210 may acquire information about a location of the external electronic device, based on the wireless signal received from the external electronic device. In an example, the processor 210 may determine in which identification place the external electronic device is located within the plurality of identification places included in the map information, based on the acquired information about the location of the external electronic device. For example, the plurality of identification places around the electronic device 101 included in the map information may include a first identification place and a second identification place. The processor 210 may identify a first external electronic device located in the first identification place by utilizing a wireless signal acquired from the first external electronic device and the map information. The processor 210 may identify the first external electronic device located in the first identification place, as the first object. The processor 210 may identify a second external electronic device located in the second identification place by utilizing a wireless signal acquired from the second external electronic device and the map information. The processor 210 may identify the second external electronic device located in the second identification place as a second object.

In an embodiment, the processor 210 may acquire a distance value between the electronic device 101 and an external electronic device having transmitted a wireless signal, based on information about a wireless signal strength included in the wireless signal received from the external electronic device. In another example, the processor 210 may measure a signal strength of a signal transmitted to and/or received from the external electronic device. The processor 210 may acquire a distance value between the external electronic device and the electronic device 101, based on a directly measured signal strength of a signal transmitted to and/or received from the external electronic device.

Figure 4:
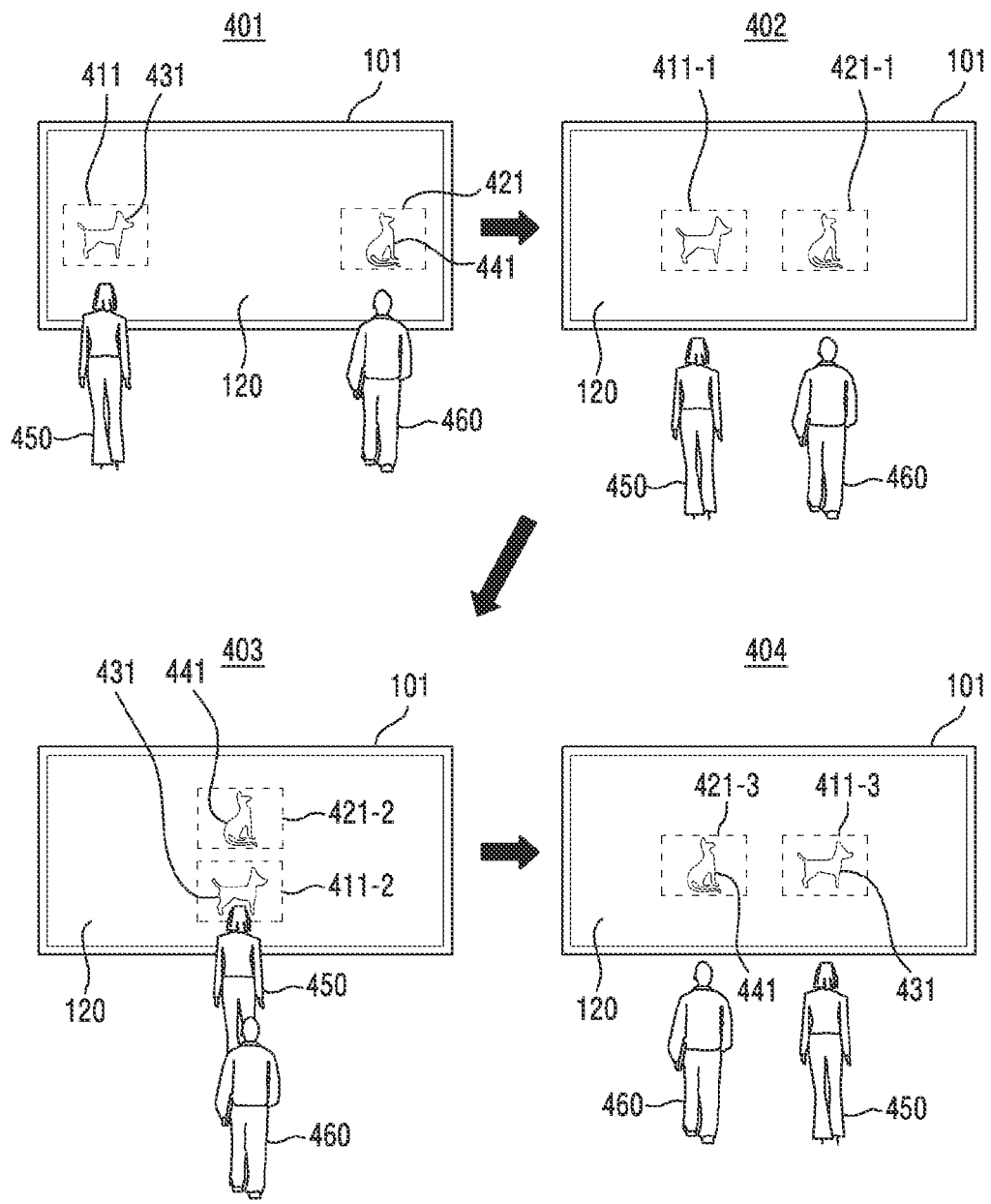
FIG. 4 is a diagram illustrating a display of an electronic device that presents content, according to various embodiments.

In operation 303, the electronic device 101 (e.g., the processor 210 of FIG. 2) of an embodiment may determine a first coordinate value on the display 120 corresponding to the first object (e.g., the first object 450 of FIG. 4) and a second coordinate value on the display 120 corresponding to the second object (e.g., the second object 460 of FIG. 4).

In an embodiment, in order to output content for the object identified in operation 301 through the display 120, the processor 210 may determine a coordinate value on the display 120 corresponding to the identified object. In an example, the first coordinate value and the second coordinate value on the display 120 may correspond to coordinate information on the display 120.

In an embodiment, the processor 210 may determine the first coordinate value corresponding to the first object on the display 120, based on the information about the first object. In an example, the information about the first object may include information about the first object acquired through the camera sensor 220 or the wireless communication circuit 240 through operation 301. In an example, the information about the first object may include information about a location of the first object, appearance information of the first object, and eye tracking information of the first object.

In an embodiment, the processor 210 may determine the second coordinate value corresponding to the second object on the display 120, based on the information about the second object. The information about the second object may include information about a location of the second object acquired through the camera sensor 220 or the wireless communication circuit 240 through operation 301. In an example, the information about the second object may include information about the location of the second object, appearance information of the second object, and eye tracking information of the second object.

In an embodiment, the first coordinate value on the display 120 corresponding to the first object may be determined using the eye tracking information of the first object. In another example, the first coordinate value corresponding to the first object may be determined based on a height of the first object and location information of the first object.

In an embodiment, the second coordinate value on the display 120 corresponding to the second object may be determined using the eye tracking information of the second object. In another example, the second coordinate value corresponding to the second object may be determined based on a height of the second object and location information of the second object.

In an embodiment, the first coordinate value may be updated based on information about the movement of the first object. The second coordinate value may be updated based on information about the movement of the second object. In an example, the processor 210 may include the information about the movement of the first object and the information about the movement of the second object through the camera sensor 220. In an example, the information about the movement of the first object may include a movement direction and movement speed of the first object. The information about the movement of the second object may include information about a movement direction and movement speed of the second object. For example, when the processor 210 recognizes the movement direction of the first object as a first direction through the camera sensor 220, the first coordinate value corresponding to the first object may also change correspondingly to this. When the processor 210 recognizes the movement direction of the second object as a second direction through the camera sensor 220, the second coordinate value corresponding to the second object may also change correspondingly to this.

According to an embodiment, in operation 305, the electronic device 101 (e.g., the processor 210 of FIG. 2) may determine a first region of the display 120 (e.g., the first region 410 of FIG. 4), based on the first coordinate value.

According to an embodiment, in operation 305, the electronic device 101 (e.g., the processor 210 of FIG. 2) may determine a second region of the display 120 (e.g., the second region 420 of FIG. 4), based on the second coordinate value.

In an embodiment, the first region may correspond to a region for outputting a first content corresponding to the first object. The second region may correspond to a region for outputting a second content corresponding to the second object.

In an embodiment, the first coordinate value may correspond to the center of the first content to be output through the first region. The second coordinate value may correspond to the center of the second content to be output through the second region.

In an embodiment, the first region and the second region may be arranged in at least a portion of the display 120.

In an embodiment, the size and/or shape of the first region and the second region may depend on setting information previously stored in the memory 250. The first region and the second region may be set in various forms.

In an embodiment, the processor 210 may set a boundary line (e.g., 501 of FIG. 5) of the display 120 so as to determine the first region and the second region. For example, the processor 210 may set a boundary line in a screen region of the display 120, and set one region as the first region, based on the boundary line, and set a remaining region as the second region.

In an embodiment, the boundary line set in the screen region of the display 120 may correspond to a horizontal line, a vertical line, and/or a diagonal line. In an example, as a distance between the first coordinate value and the second coordinate value is changed, an angle formed between the boundary line set in the screen region of the display 120 and a horizontal axis (e.g., 701 in FIG. 7) of the display 120 may be changed in response to a change value of the distance between the first coordinate and the second coordinate value. For example, when a diagonal boundary line set in the screen region of the display 120 is changed to a horizontal boundary line as the distance between the first coordinate value and the second coordinate value is changed, the first region and the second region may be distinguished according to the changed boundary line.

In another example, the first region and the second region may be set in various shapes. For example, the first region and the second region may include a polygonal region such as a rectangular shape, an oval shape, or a square shape without a separate boundary line in the screen region of the display 120. For example, the first region may be set to the rectangular shape, and the second region may be set to a diamond shape. In an example, the ratio and size of the first region and the second region may be changed by a user input. In an example, the first region and the second region of the display 120 are not limited thereto, and the first region and the second region of the display 120 may be determined in various ways.

Hereinafter, examples of the first region and the second region for outputting content on the display 120 will be described in greater detail below with reference to FIG. 4, FIG. 5 and FIG. 6.

In operation 307, the electronic device 101 (e.g., the processor 210 of FIG. 2) of an embodiment may output a first content (e.g., the first content 431 of FIG. 4) corresponding to the first object (e.g., the first object 450 of FIG. 4) to the first region (e.g., the first region 410 of FIG. 4).

In operation 309, the electronic device 101 (e.g., the processor 210 of FIG. 2) of an embodiment may output a second content (e.g., the second content 441 of FIG. 4) corresponding to the second object (e.g., the second object 460 of FIG. 4) to the second region (e.g., the second region 420 of FIG. 4).

In an embodiment, the first content output through the first region and the second content output through the second region may refer, for example, to digital content. The digital content may include still images or moving images displayed through the display.

In an embodiment, the first content may correspond to a target advertisement corresponding to the first object. In an example, the second content may correspond to a target advertisement corresponding to the second object.

In an embodiment, the first content corresponding to the first object may be determined based on location information, time information, and/or first user information. In an example, the processor 210 may receive information about a first user who uses a first external electronic device from the first external electronic device through the wireless communication circuit 240.

In an embodiment, the second content corresponding to the second object may be determined based on location information, time information, and/or second user information of the electronic device 101. In an example, the processor 210 may receive information about a second user who uses a second external electronic device from the second external electronic device through the wireless communication circuit 240.

In an embodiment, the location information and time information of the electronic device 101 may correspond to environmental information of the electronic device 101. In an example, the processor 210 may acquire the environmental information of the electronic device 101 through the wireless communication circuit 240 and/or the camera sensor 220.

In an embodiment, user information may refer, for example, to information related to a user who uses an external electronic device. For example, the user information may include at least one of a user's spoken language, a user's gender, a user's age, the type of preferred content, a product purchase history, or a user's nationality.

In an embodiment, by applying environmental information of the electronic device 101 and user information of the external electronic device to an algorithm related to content identification information stored in the memory 250, the processor 210 may identify content for outputting through the display 120. In an example, contents output through the first region and the second region may be the same content or may be separate contents distinct from each other.

In operation 311, the electronic device 101 (e.g., the processor 210 of FIG. 2) of an embodiment may determine whether a distance between the first coordinate value and the second coordinate value is within a specified range.

In an embodiment, the processor 210 may determine a value of the distance between the first coordinate value and the second coordinate value. The processor 210 may determine whether it is within the specified range, based on the determined distance between the first coordinate value and the second coordinate value.

In an embodiment, the specified range may refer, for example, to the distance between the first coordinate value and the second coordinate value when at least a portion of the range of the first region determined based on the first coordinate value is overlapped with the second region determined based on the second coordinate value.

However, it is not limited to this. In another example, the specified range may be set based on the information about the first object and the information about the second object acquired in operation 301. For example, as the movement direction of the first object and the movement direction of the second object are changed, the processor 210 may predict an intersection range of the first object and the second object through information of the first object and information about the second object. The processor 210 may predict a change value of a distance between the first coordinate value and the second coordinate value, based on the intersection range of the first object and the second object. The specified range may be stored in the memory 250, based on the predicted change value of the distance between the first coordinate value and the second coordinate value. In an example, the specified range set based on the predicted intersection point may correspond to a range for preventing and/or reducing overlap between the first content output through the first region and the second content output through the second region.

Hereinafter, a method of predicting the intersection range of the first object and the second object through the information of the first object and the information of the second object will be described in greater detail below with reference to FIG. 8.

In operation 313, when the distance between the first coordinate value and the second coordinate value falls within the specified range, the electronic device 101 (e.g., the processor 210 of FIG. 2) of an embodiment may arrange the first content and the second content in a vertical direction in the screen region of the display 120.

In an embodiment, when the distance between the first coordinate value and the second coordinate value is within the specified range, the processor 210 may arrange the first content corresponding to the first object and the second content corresponding to the second object in the vertical direction in the screen region of the display 120.

In an embodiment, when the distance between the first coordinate value and the second coordinate value is within the specified range, the processor 210 may determine a first distance value between the camera sensor 220 (or the distance detection sensor 230) and the first object and a second distance value between the camera sensor 220 (or the distance detection sensor 230) and the second object through the camera sensor 220 (or the distance detection sensor 230).

In an embodiment, the processor 210 may arrange one of the first content and the second content in an upper direction of the display 120, based on the first distance value and the second distance value, and arrange the remaining content in a lower direction of the display 120. In an example, when the first distance value is greater than the second distance value, the processor 210 may control the display 120 to display the first content above the second content on a screen of the display 120. In another example, when the second distance value is greater than the first distance value, the processor 210 may control the display 120 to display the second content above the first content on the screen of the display 120.

In an embodiment, when the distance between the first coordinate value and the second coordinate value is within the specified range, the processor 210 may control the display 120 wherein at least one of a height at which the first content 431 is output on the display 120 and a height at which the second content 441 is output on the display 120 are gradually changed, based on a change of the distance between the first coordinate value and the second coordinate value.

Hereinafter, regarding controlling the display 120 wherein the height at which the first content 431 is output and the height at which the second content 441 is output are gradually changed based on the first coordinate value and the second coordinate value, a description will be made in detail with reference to FIG. 7.

When the distance between the first coordinate value and the second coordinate value does not fall within the specified range in operation 311, the electronic device 101 (e.g., the processor 210 of FIG. 2) of an embodiment may return to operation 303.

FIG. 4 is a diagram illustrating a display 120 of an electronic device 101 that presents content, according to various embodiments.

Referring to state 401 of FIG. 4, the processor 210 may recognize a first object 450, and determine a first coordinate value corresponding to the first object 450. In an example, the first coordinate value may correspond to coordinate information on the display 120.

In an embodiment, the processor 210 may recognize a second object 460, and determine a second coordinate value corresponding to the second object 460. In an example, the second coordinate value may correspond to coordinate information on the display 120.

In an embodiment, the processor 210 may determine a first region 411 for outputting a first content 431 corresponding to the first object 450, based on the first coordinate value.

In an embodiment, the processor 210 may determine a second region 421 for outputting a second content 441 corresponding to the second object 460, based on the second coordinate value.

In an embodiment, the first region 411 and the second region 421 are shown in a rectangular shape, but are not limited thereto, and the shape of the first region 411 and the second region 421 may include a shape such as a circular shape, an oval shape, or a trapezoid shape.

Referring to 402 of FIG. 4, as the first object 450 moves, the first region 411 for outputting the first content 431 may move to a first region 411-1 by the processor 210. In an example, as the second object 460 moves, the second region 421 for outputting the second content 441 may move to a second region 421-1 by the processor 210.

In an embodiment, when the first object 450 moves in a first movement direction, the processor 210 may update a first coordinate value corresponding to the first object 450 correspondingly to the first movement direction. The processor 210 may determine the first region 411-1 for outputting the first content 431, based on the updated first coordinate value. In an example, the first region 411 may move to the first region 411-1 in the display 120.

In an embodiment, when the second object 460 moves in a second movement direction different from the first movement direction, the processor 210 may update a second coordinate value corresponding to the second object 460 correspondingly to the second movement direction. The processor 210 may determine a second region 421-1 for outputting the second content 441, based on the updated second coordinate value. In an example, the second region 421 of the display 120 may move to the second region 421-1.

In an embodiment, a distance between the first region 411-1 and the second region 421-1 may be relatively shorter than the distance between the first region 411 and the second region 421.

Referring to 403 of FIG. 4, when the distance between the first coordinate value corresponding to the first region 411-1 and the second coordinate value corresponding to the second region 421-1 falls within a specified range, the processor 210 may arrange the first content 431 and the second content 441 in a vertical direction of the display 120. Arranging the first content 431 and the second content 441 in the vertical direction of the display 120 may refer, for example, to one of the first content 431 and the second content 441 being arranged below based on a direction in which the display 120 is arranged, and the remaining one is arranged above the other one.

In an embodiment, when a first distance value between the first object 450 and the electronic device 101 is shorter than a second distance value between the second object 460 and the electronic device 101, the processor 210 may arrange the first content 431 in a lower direction of the second content 441. In this case, by arranging the second content 441 in an upper direction of the first content 431, a view obstructed by the first object 450 and the first content 431 in a position of the second object 460 is minimized or reduced, and a user who is in a position of the second object 460 may more easily check the second content 441.

In an embodiment, when a distance between the first coordinate value corresponding to the first region 411-1 and the second coordinate value corresponding to the second region 421-1 is within a specified range, the processor 210 may control the display 120 wherein a height of the first content 431 and a height of the second content 441 are gradually changed in a screen region of the display 120 as the distance between the first coordinate value corresponding to the first region 411-1 and the second coordinate value corresponding to the second region 421-1 is changed.

Referring to 404 of FIG. 4, as the first object 450 moves, the first region 411-2 for outputting the first content 431 may move to a first region 411-3. In an example, as the second object 460 moves, the second region 421-2 for outputting the second content 441 may move to a second region 421-3.

In an embodiment, when the first object 450 moves in a first movement direction, the processor 210 may update the first coordinate value corresponding to the first object 450 correspondingly to the first movement direction. In an example, when the second object 460 moves in a second movement direction different from the first movement direction, the processor 210 may update the second coordinate value corresponding to the second object 460 correspondingly to the second movement direction. In an example, the processor 210 determines whether a distance between the updated first coordinate value and the updated second coordinate value is within a specified range, and when the distance between the updated first coordinate value and the updated second coordinate value exceeds the specified range, the processor 210 may determine the first region 411-3 for outputting the first content 431, based on the updated first coordinate value. The processor 210 may determine the second region 421-3 for outputting the second content 441, based on the updated second coordinate value.

In an embodiment, the processor 210 may output the first content 431 through the first region 411-3. The processor 210 may output the second content 441 through the second region 421-3.

Figure 5:
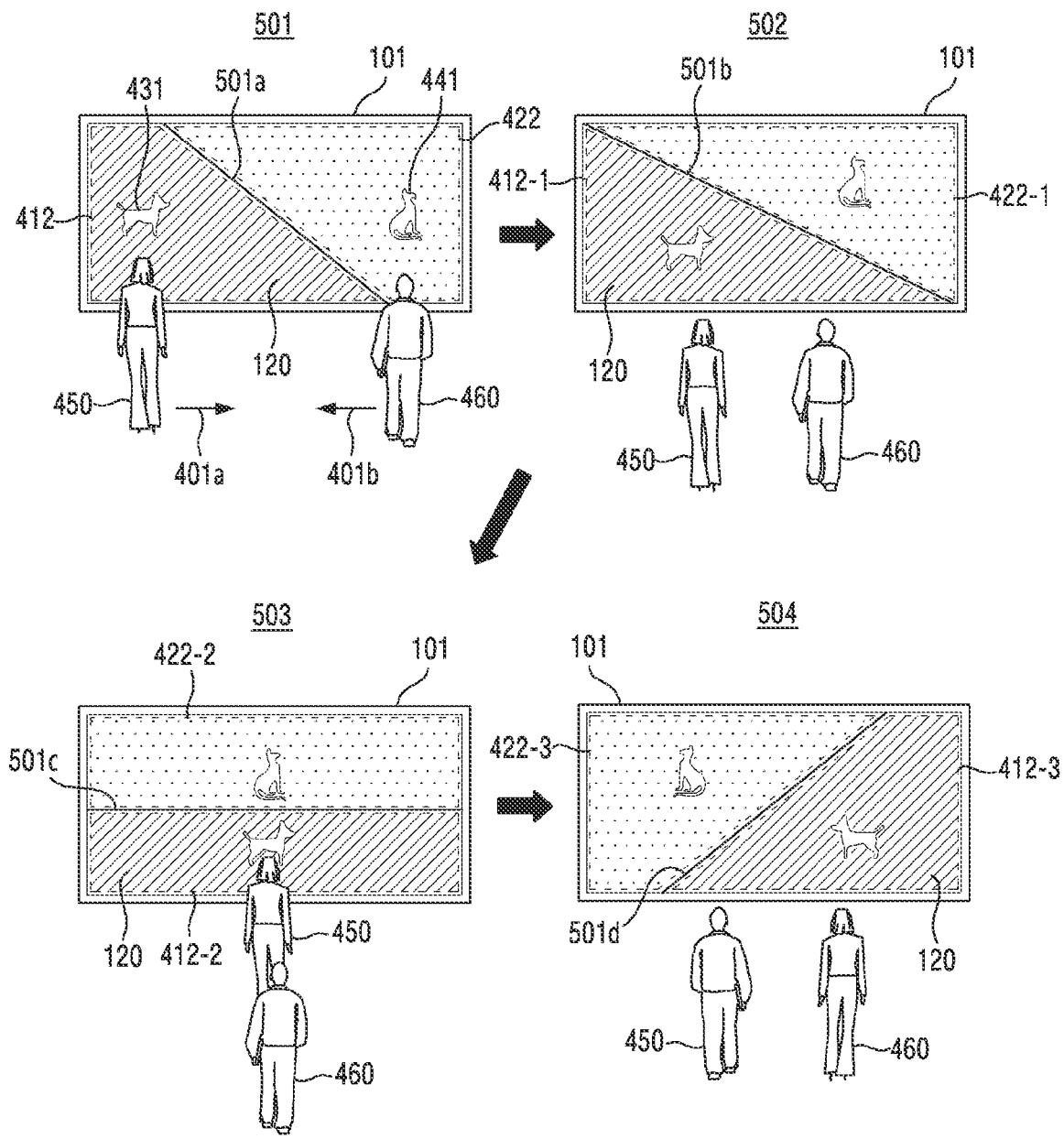
FIG. 5 is a diagram illustrating a display of an electronic device that presents content, according to various embodiments.

FIG. 5 is a diagram illustrating a display 120 of an electronic device 101 that presents content, according to various embodiments.

Referring to FIG. 5, the processor 210 may set a boundary line in a screen region of the display 120 in order to determine a first region 412 for outputting a first content 431 and a second region 422 for outputting a second content 441. In an example, the boundary line set in the screen region of the display 120 may correspond to a horizontal line, a vertical line, and/or a diagonal line.

In an embodiment, one region may be determined as the first region 412, based on the boundary line set in a screen region of the display 120, and the remaining one region may be determined as the second region 422, based on the boundary line.

In an embodiment, the boundary line set in the screen region of the display 120 may be determined based on a first coordinate value corresponding to a first object 450 and a second coordinate value corresponding to a second object. For example, the larger a distance value between the first coordinate value and the second coordinate value is, the relatively larger an angle formed between the boundary line set in the screen region of the display 120 and a horizontal direction of the display 120 may be.

Hereinafter, the angle formed between the boundary line set in the screen region of the display 120 and the horizontal direction of the display 120 will be described in greater detail below with reference to FIG. 7.

Referring to state 501 of FIG. 5, the processor 210 may recognize the first object 450, and determine the first coordinate value corresponding to the first object 450. The processor 210 may recognize the second object 460, and determine the second coordinate value corresponding to the second object 460.

In an embodiment, the processor 210 may determine the first region 412 for outputting the first content 431 corresponding to the first object 450, based on the first coordinate value.

In an embodiment, the processor 210 may determine the second region 422 for outputting the second content 441 corresponding to the second object 460, based on the second coordinate value.

Referring to 501 of FIG. 5, the processor 210 may set a boundary line 501a between the first region 412 and the second region 412 in the screen region of the display 120, based on a distance between the first coordinate value and the second coordinate value.

In an embodiment, the processor 210 may acquire a first distance value between the camera sensor 220 and the first object 450 through the camera sensor 220. The processor 210 may acquire a second distance value between the camera sensor 220 and the second object 460 through the camera sensor 220. In an example, the processor 210 may arrange content corresponding to an object that is further away from the electronic device 101, at an upper end of the display 120. For example, when the first distance value is shorter than the second distance value, the processor 210 may set the boundary line 501a to arrange the first content 431 corresponding to the first object 450 at a lower side surface of the display 120, based on the first coordinate value. In another example, when the first distance value is shorter than the second distance value, the processor 210 may set the boundary line in the screen region of the display 120 wherein the first region 412 for outputting the first content 431 corresponding to the first object 450 is arranged at an upper side surface of the display 120, based on the first coordinate value.

Referring to 502 of FIG. 5, as the first object 450 moves, the first region 412 for outputting the first content 431 may move to a first region 412-1 by the processor 210. In an example, as the second object 460 moves, the second region 422 for outputting the second content 441 may move to a second region 422-1 by the processor 210.

Referring to 502 of FIG. 5, the first object 450 may move in a first movement direction 401a. The second object 460 may move in a second movement direction 401b that is different from the first movement direction. In an example, the processor 210 may detect the movement of the first object 450 and the movement of the second object 460 through the camera sensor 220 (or the distance detection sensor 240). When the processor 210 detects the movement of the first object 450 and the movement of the second object 460, the processor 210 may control the boundary line set in the screen of the display 120 to control the shape of the first region 412 and the second region 422. For example, as the processor 210 controls the boundary line 501*a* whose angle with a horizontal axis (e.g., 701 of FIG. 7) of the display 120 has a first angle, to a boundary line 501*b* whose angle with the horizontal axis of the display 120 has a second angle smaller than the first angle, the first region 412 and the second region 422 may be changed to the first region 412-1 and the second region 422-1 respectively.

Referring to 503 of FIG. 5, when a distance between the first coordinate value corresponding to the first region 412-1 and the second coordinate value corresponding to the second region 422-1 falls within a specified range, the processor 210 may arrange the first content 431 and the second content 441 in a vertical direction of the display 120.

In an embodiment, when the processor 210 determines that the distance between the first coordinate value corresponding to the first region 412-1 and the second coordinate value corresponding to the second region 422-1 falls within the specified range, the processor 210 may control the boundary line 501*b* having a second angle of the display 120 to a boundary line 501*c* corresponding to a horizontal line.

In an embodiment, when the distance between the first coordinate value corresponding to the first region 412-1 and the second coordinate value corresponding to the second region 422-1 falls within the specified range, the processor 210 may arrange the first content 431 and the second content 441 in a vertical direction within the screen region of the display 120, based on the boundary line 501*c*.

In an embodiment, when a first distance value between the first object 450 and the electronic device 101 is shorter than a second distance value between the second object 460 and the electronic device 101, the processor 210 may arrange the first content 431 in a lower direction, based on the boundary line 501*c*. In this case, the processor 210 may arrange the second content 441 in an upper direction, based on the boundary line 501*c*.

Referring to 504 of FIG. 5, as the first object 450 moves, a first region 412-2 for outputting the first content 431 may move to a first region 412-3. In an example, as the second object 460 moves, it may move to a second region 422-3 for outputting the second content 441.

In an embodiment, when the first object 450 moves in a first movement direction (rightward direction), the processor 210 may update the first coordinate value corresponding to the first object 450 correspondingly to the first movement direction. In an example, when the second object 460 moves in a second movement direction (left direction) different from the first movement direction, the processor 210 may update the second coordinate value corresponding to the second object 460 correspondingly to the second movement direction. In an example, the processor 210 determines whether a distance between the updated first coordinate value and the updated second coordinate value is within a specified range, and when the distance between the updated first coordinate value and the updated second coordinate value exceeds the specified range, the processor 210 may change the boundary line 501*c* set in the screen region of the display 120 to a boundary line 501*d*. In an example, an angle formed between the boundary line 501*d* and the horizontal direction of the display 120 may be greater than the angle formed between the boundary line 501*c* and the horizontal direction of the display 120. The processor 210 may control the display 120 to output the first content 431 in the first movement direction (rightward direction), based on the boundary line 501*d*. The processor 210 may control the display 120 to output the second content 441 in the second movement direction (left direction), based on the boundary line 501*d*.

Figure 6:
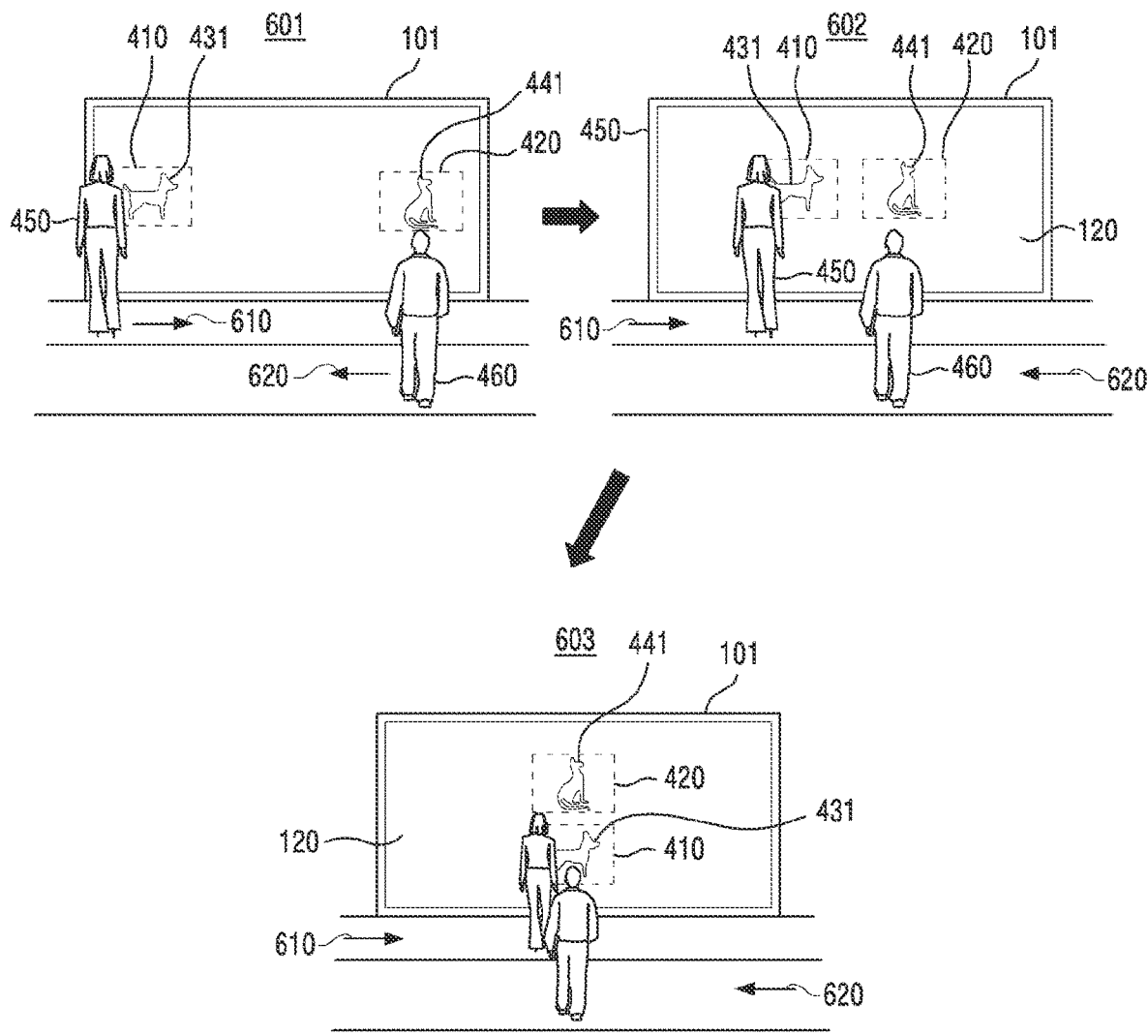
FIG. 6 is a diagram illustrating a display of an electronic device that presents content, according to various embodiments.

FIG. 6 is a diagram illustrating a display 120 of an electronic device 101 that presents content, according to various embodiments.

Referring to 601 of FIG. 6, when a first object 450 and a second object 460 are on a moving walk, the second object 460 may move in a first movement direction 610. The second object 460 may move in a second movement direction 620 that is opposite to the first movement direction 610.

In an embodiment, the processor 210 may determine a region for outputting content corresponding to an object, based on a movement direction and speed of the moving walk previously stored in the memory 250.

In an embodiment, the processor 210 may determine whether a distance between a first coordinate value corresponding to the first object 450 and a second coordinate value corresponding to the second object 460 is within a specified range.

Referring to 602 and 603 of FIG. 6, when the distance between the first coordinate value and the second coordinate value falls within the specified range, the processor 210 may arrange a first content 431 corresponding to the first object 450 and a second content 441 corresponding to the second object 460 in a vertical direction of the display 120. In this case, when the processor 210 fails to measure a first distance between the electronic device 101 and the first object 450 and a second distance between the electronic device 101 and the second object 460, the processor 210 may arrange content corresponding to an object moving in a direction preset in the memory 250, in a lower direction of the display 120. For example, when an instruction is stored in the memory 250 to arrange content corresponding to an object moving along the first movement direction 610 in the lower direction of the display 120, when it is determined that the object 450 moves along the first movement direction 610, the processor 210 may arrange the first content 431 corresponding to the first object 450 in the lower direction of the display 120. When it is determined that the second object 460 moves along the second movement direction 620, the processor 210 may arrange the second content 441 corresponding to the second object 460 in an upper direction of the display 120.

Figure 7A:
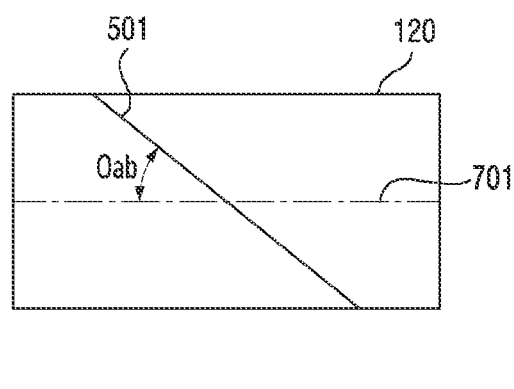
FIGS. 7A and 7B are diagrams illustrating the arrangement relationship of content output on a display, based on a distance between objects, according to various embodiments.
Figure 7B:
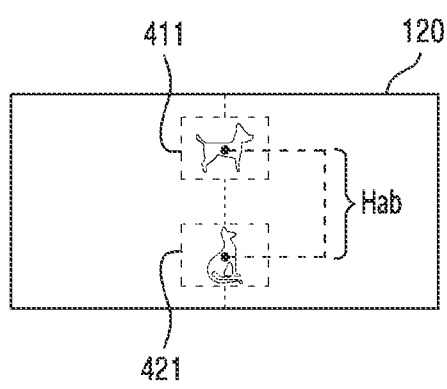

FIGS. 7A and 7B are diagrams illustrating the arrangement relationship of content output to the display 120, based on a distance between objects, according to various embodiments.

FIG. 7A represents a relationship between a boundary line 501, which is set in a screen region of the display 120 to determine a first region 412 for outputting a first content and a second region 422 for outputting a second content according to FIG. 5, and a horizontal axis 701 of the display 120.

In an embodiment, the processor 210 may set the boundary line 501 in which an angle (Oab) formed between the boundary line 501 and the horizontal axis 701 of the display 120 is relatively small as a distance between a first coordinate value corresponding to the first object 450 and a second coordinate value corresponding to the second object 460 gets smaller. For example, the processor may determine the boundary line 501 between two regions, based on a formula that calculates the angle (Oab) in proportion to the distance between the first coordinate value and the second coordinate value.

In an example, the processor 210 may determine the angle (Oab) formed between the boundary line 501 and the horizontal axis 701 of the display 120 by considering a system stored in the processor 210.

FIG. 7B represents a height relationship between a first region 411 and a second region 421 when the first region 411 for outputting a first content and the second region 421 for outputting a second content are arranged in a vertical direction of the display 120 according to FIG. 4.

In an embodiment, the processor 210 may arrange the first region 411 and the second region 421 wherein a height difference (Hab) between the first region 411 and the second region 421 is relatively large as the distance between the first coordinate value corresponding to the first object 450 and the second coordinate value corresponding to the second object 460 gets smaller. For example, the processor may determine positions to arrange the first region 411 and the second region 421, based on a formula that calculates the height difference (Hab) in inverse proportion to the distance between the first coordinate value and the second coordinate value. In an example, the processor 210 may determine the height difference (Hab) between the first region 411 and the second region 421 by considering the system stored in the processor 210.

Figure 8:
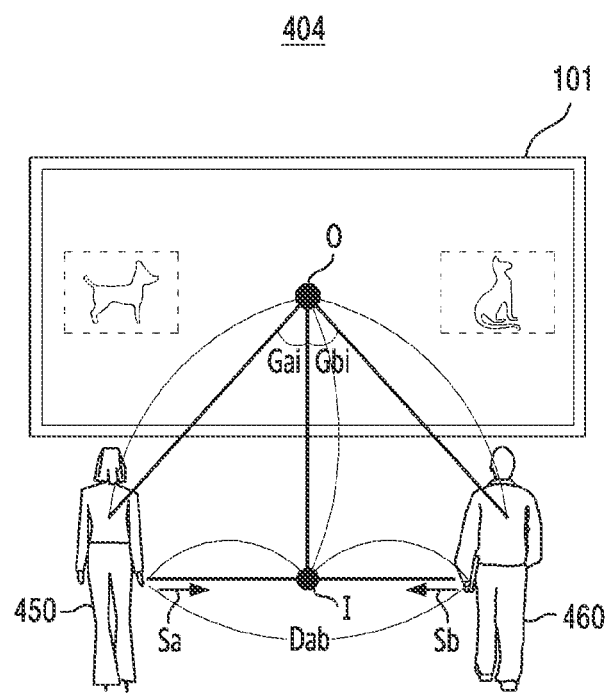
FIG. 8 is a diagram illustrating an example method for predicting an intersection point of a plurality of objects, according to various embodiments.

FIG. 8 is a diagram illustrating an example method for predicting an intersection point of a plurality of objects, according to various embodiments.

In an embodiment, the processor 210 may identify an object located in each of a plurality of zones with respect to a surrounding place where the electronic device 101 is located through the camera sensor 220 (or the distance detection sensor 230).

Referring to FIG. 8, the processor 210 may identify a first object 450 and a second object 460 through a camera sensor (e.g., the camera sensor 220 of FIG. 2). In an example, in response to identifying the first object 450 and the second object 460, the processor 210 may acquire a speed (Sa) of the first object 450, a speed (Sb) of the second object 460, and a distance value (Dab) of the first object 450 and the second object 460 (Dab), using the camera sensor 220 corresponding to a camera sensor or the distance detection sensor 230 corresponding to a distance detection sensor.

In an embodiment, the processor 210 may determine an intersection time point (t) of the first object 450 and the second object 460, based on the acquired speed (Sa) of the first object 450, the speed (Sb) of the second object 460, and the distance value (Dab) of the first object 450 and the second object 460 (Dab).

In an embodiment, the processor 210 may acquire an intersection point (I) of the first object 450 and the second object 460, based on the intersection time point (t) of the first object 450 and the second object 460 and the speed (Sa) of the first object 450.

In an embodiment, the processor 210 may acquire an angle (Gai) among the first object 450, the location of the electronic device 101, and the intersection point (I) and an angle (Gbi) among the second object 460, the location of the electronic device 101, and the intersection points (I) using the second law of cosines.

In an embodiment, the processor 210 may set a specified range for determining whether a distance between a first coordinate value and a second coordinate value falls within the specified range, using the acquired intersection point (I) of the first object 450 and the second object 460, the angle (Gai) among the first object 450, the location of the electronic device 101 and the intersection point (I), and/or the angle (Gbi) among the second object 460, the location of the electronic device 101 and the intersection point (I).

Figure 9:
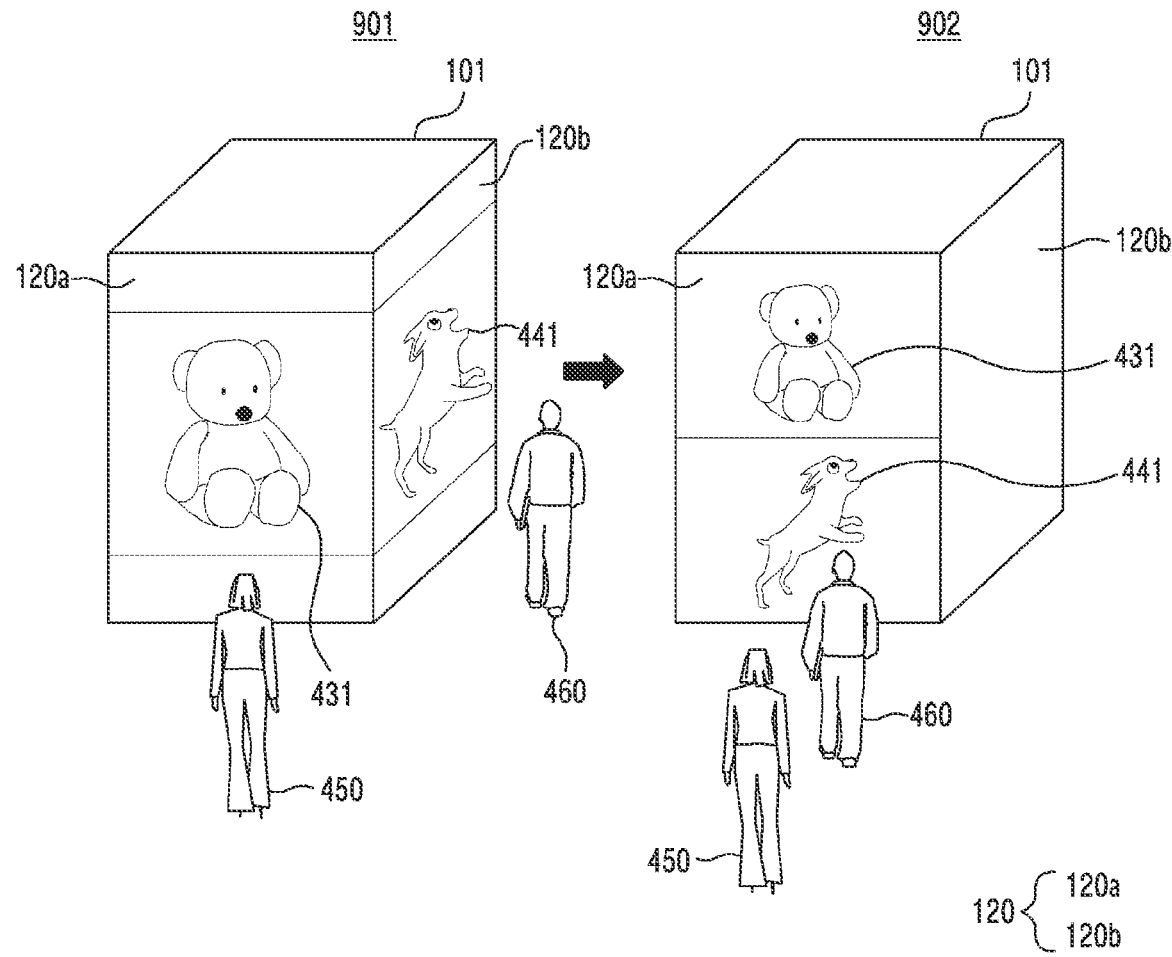
FIG. 9 is a diagram illustrating a display of an electronic device that presents content, according to various embodiments.

FIG. 9 is a diagram illustrating a display 120 of an electronic device 101 that presents content, according to various embodiments.

In an embodiment, the electronic device 101 may include a device of a rectangular parallelepiped shape. However, it is not limited thereto, and the electronic device 101 may include a device of a polyhedron shape.

In an embodiment, the electronic device 101 may include a plurality of displays 120. In an example, the display 120 may include a display 120a and a display 120b. The number of displays 120 is not limited thereto, and the display 120 may include a third display, a fourth display, . . . , an nth display.

In an embodiment, among the plurality of displays 120, the display 120a may be arranged to face a first direction. The display 120b may be arranged to face a second direction that is distinct from the first direction.

Referring to 901 of FIG. 9, the processor 210 may identify a first object 450. The processor 210 may determine a first coordinate value corresponding to the first object 450 in response to identification of the first object 450. The first coordinate value may correspond to coordinate information on the display 120. In an example, since the first object 450 is arranged in a surrounding place where the display 120a among the plurality of displays 120 is arranged, the processor 210 may determine the first coordinate value corresponding to the first object 450 on the display 120a.

Referring to 901 of FIG. 9, the processor 210 may identify a second object 460. The processor 210 may determine a second coordinate value corresponding to the second object 460 in response to identification of the second object 460. Since the second object 460 is arranged in a surrounding place where the display 120b among the plurality of displays 120 is arranged, the processor 210 may determine the second coordinate value corresponding to the second object 460 on the display 120b.

In an embodiment, the processor 210 may determine an output device for outputting a first content 431 corresponding to the first object 450 and a second content 441 corresponding to the second object 460, among a plurality of displays 120, based on the determined first coordinate value and second coordinate value.

In an embodiment, the processor 210 may output the first content 431 corresponding to the first object 450 through the display 120a, based on the first coordinate value determined on the display 120a.

In an embodiment, the processor 210 may output the second content 441 corresponding to the second object 460 through the display 120b, based on the second coordinate value determined on the display 120b.

In an embodiment, as the first object 450 and/or the second object 460 moves, the first coordinate value corresponding to the first object 450 and/or the second coordinate value corresponding to the second object 460 may change.

Referring to 902 of FIG. 9, the processor 210 may update the second coordinate value corresponding to the second object 460 as the second object 460 moves from a region of the display 120b arranged to face the second direction to a region of the display 120a arranged to face the first direction. In an example, the processor 210 may update the second coordinate value determined on the display 120b by a second coordinate value on the display 120a. In an example, since the first object 450 and the second object 460 are located within a region toward which the display 120a faces, the first coordinate value corresponding to the first object 450 and the second coordinate value corresponding to the second object 460 may be determined within the same display.

In an embodiment, when a display for outputting the first content 431 corresponding to the first object 450 and the second content 441 corresponding to the second object 460 corresponds to the same display based on the first coordinate value and the second coordinate value, the processor 210 may arrange and output the first content 431 and the second content 441 in a vertical direction with respect to the same display.

In an embodiment, when the display for outputting the first content 431 and the second content 441 corresponds to the same display (e.g., the display 120a or the display 120b) among the plurality of displays 120 based on the determined first coordinate value and second coordinate value, the processor 210 may acquire a first distance value between the electronic device 101 and the first object 450 and a second distance value between the electronic device 101 and the second object 460 through the camera sensor 220 (or the distance detection sensor 230).

In an embodiment, when the display 120 for outputting the first content 431 and the second content 441 is the same as the display 120a, the processor 210 may arrange the first content 431 in an upper direction of the display 120a, and the second content 441 in a lower direction of the display 120a, when the first distance value is greater than the second distance value. In another example, when the first distance value is smaller than the second distance value, the processor 210 may arrange the first content 431 in the lower direction of the display 120a, and the second content 441 in the upper direction of 120a of the display 120a.

Figure 10:
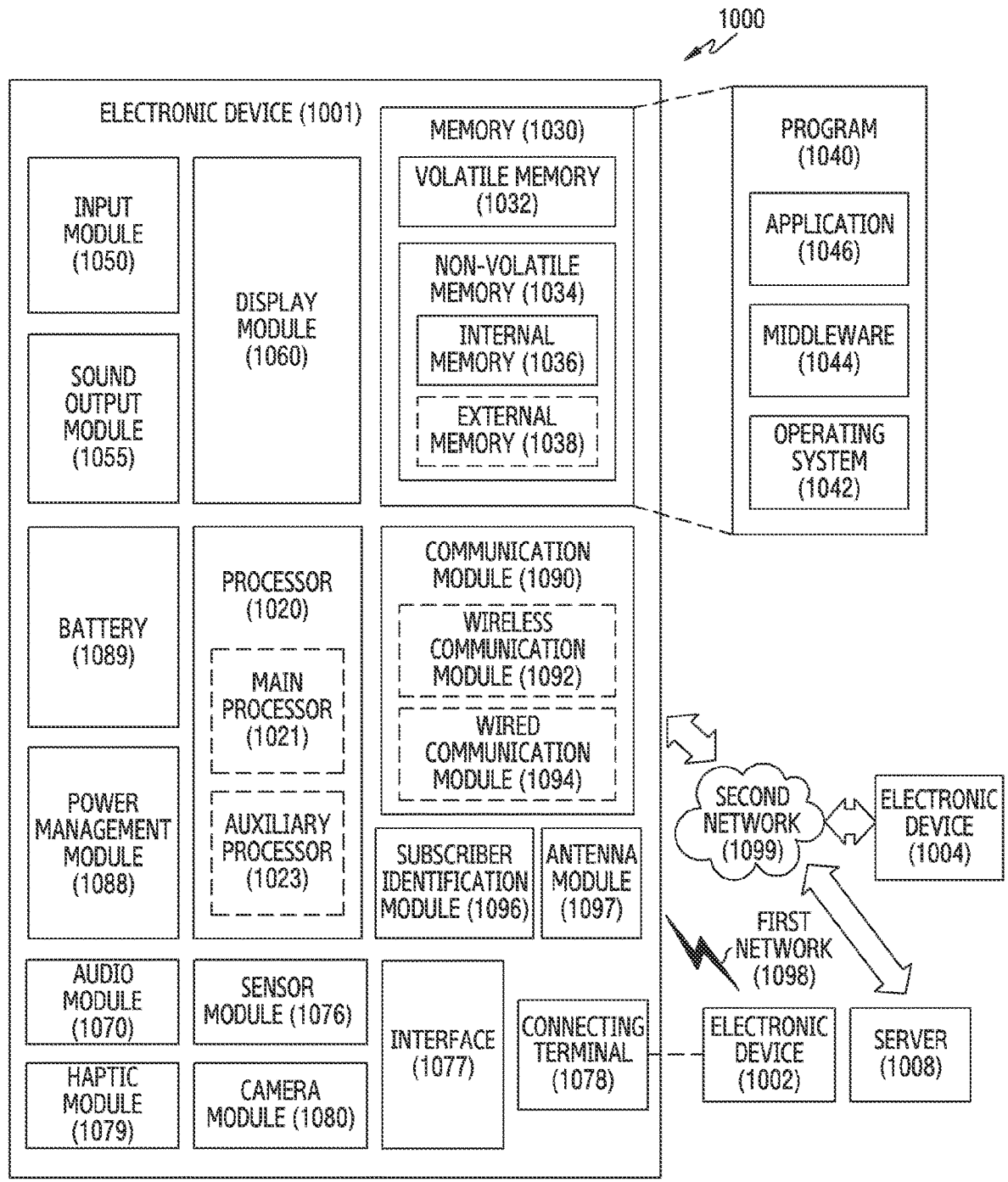
FIG. 10 is a block diagram illustrating an example electronic device in a network environment, according to various embodiments.

FIG. 10 is a block diagram illustrating an example electronic device 1001 in a network environment 1000 according to various embodiments.

Referring to FIG. 10, the electronic device 1001 in the network environment 1000 may communicate with an electronic device 1002 via a first network 1098 (e.g., a short-range wireless communication network), or at least one of an electronic device 1004 or a server 1008 via a second network 1099 (e.g., a long-range wireless communication network). According to an embodiment, the electronic device 1001 may communicate with the electronic device 1004 via the server 1008. According to an embodiment, the electronic device 1001 may include a processor 1020, memory 1030, an input module 1050, a sound output module 1055, a display module 1060, an audio module 1070, a sensor module 1076, an interface 1077, a connecting terminal 1078, a haptic module 1079, a camera module 1080, a power management module 1088, a battery 1089, a communication module 1090, a subscriber identification module (SIM) 1096, or an antenna module 1097. In various embodiments, at least one of the components (e.g., the connecting terminal 1078) may be omitted from the electronic device 1001, or one or more other components may be added in the electronic device 1001. In various embodiments, some of the components (e.g., the sensor module 1076, the camera module 1080, or the antenna module 1097) may be implemented as a single component (e.g., the display module 1060).

The processor 1020 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein.

As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions. The processor 1020 may execute, for example, software (e.g., a program 1040) to control at least one other component (e.g., a hardware or software component) of the electronic device 1001 coupled with the processor 1020, and may perform various data processing or computation. According to an embodiment, as at least part of the data processing or computation, the processor 1020 may store a command or data received from another component (e.g., the sensor module 1076 or the communication module 1090) in volatile memory 1032, process the command or the data stored in the volatile memory 1032, and store resulting data in non-volatile memory 1034. According to an embodiment, the processor 1020 may include a main processor 1021 (e.g., a central processing unit (CPU) or an application processor (AP)), or an auxiliary processor 1023 (e.g., a graphics processing unit (GPU), a neural processing unit (NPU), an image signal processor (ISP), a sensor hub processor, or a communication processor (CP)) that is operable independently from, or in conjunction with, the main processor 1021. For example, when the electronic device 1001 includes the main processor 1021 and the auxiliary processor 1023, the auxiliary processor 1023 may be adapted to consume less power than the main processor 1021, or to be specific to a specified function. The auxiliary processor 1023 may be implemented as separate from, or as part of the main processor 1021.

The auxiliary processor 1023 may control at least some of functions or states related to at least one component (e.g., the display module 1060, the sensor module 1076, or the communication module 1090) among the components of the electronic device 1001, instead of the main processor 1021 while the main processor 1021 is in an inactive (e.g., sleep) state, or together with the main processor 1021 while the main processor 1021 is in an active state (e.g., executing an application). According to an embodiment, the auxiliary processor 1023 (e.g., an image signal processor or a communication processor) may be implemented as part of another component (e.g., the camera module 1080 or the communication module 1090) functionally related to the auxiliary processor 1023. According to an embodiment, the auxiliary processor 1023 (e.g., the neural processing unit) may include a hardware structure specified for artificial intelligence model processing. An artificial intelligence model may be generated by machine learning. Such learning may be performed, e.g., by the electronic device 1001 where the artificial intelligence is performed or via a separate server (e.g., the server 1008). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1030 may store various data used by at least one component (e.g., the processor 1020 or the sensor module 1076) of the electronic device 1001. The various data may include, for example, software (e.g., the program 1040) and input data or output data for a command related thereto. The memory 1030 may include the volatile memory 1032 or the non-volatile memory 1034.

The program 1040 may be stored in the memory 1030 as software, and may include, for example, an operating system (OS) 1042, middleware 1044, or an application 1046.

The input module 1050 may receive a command or data to be used by another component (e.g., the processor 1020) of the electronic device 1001, from the outside (e.g., a user) of the electronic device 1001. The input module 1050 may include, for example, a microphone, a mouse, a keyboard, a key (e.g., a button), or a digital pen (e.g., a stylus pen).

The sound output module 1055 may output sound signals to the outside of the electronic device 1001. The sound output module 1055 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1060 may visually provide information to the outside (e.g., a user) of the electronic device 1001. The display module 1060 may include, for example, a display, a hologram device, or a projector and control circuitry to control a corresponding one of the display, hologram device, and projector. According to an embodiment, the display module 1060 may include a touch sensor adapted to detect a touch, or a pressure sensor adapted to measure the intensity of force incurred by the touch.

The audio module 1070 may convert a sound into an electrical signal and vice versa. According to an embodiment, the audio module 1070 may obtain the sound via the input module 1050, or output the sound via the sound output module 1055 or a headphone of an external electronic device (e.g., an electronic device 1002) directly (e.g., wiredly) or wirelessly coupled with the electronic device 1001.

The sensor module 1076 may detect an operational state (e.g., power or temperature) of the electronic device 1001 or an environmental state (e.g., a state of a user) external to the electronic device 1001, and then generate an electrical signal or data value corresponding to the detected state. According to an embodiment, the sensor module 1076 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1077 may support one or more specified protocols to be used for the electronic device 1001 to be coupled with the external electronic device (e.g., the electronic device 1002) directly (e.g., wiredly) or wirelessly. According to an embodiment, the interface 1077 may include, for example, a high definition multimedia interface (HDMI), a universal serial bus (USB) interface, a secure digital (SD) card interface, or an audio interface.

A connecting terminal 1078 may include a connector via which the electronic device 1001 may be physically connected with the external electronic device (e.g., the electronic device 1002). According to an embodiment, the connecting terminal 1078 may include, for example, a HDMI connector, a USB connector, a SD card connector, or an audio connector (e.g., a headphone connector).

The haptic module 1079 may convert an electrical signal into a mechanical stimulus (e.g., a vibration or a movement) or electrical stimulus which may be recognized by a user via his tactile sensation or kinesthetic sensation. According to an embodiment, the haptic module 1079 may include, for example, a motor, a piezoelectric element, or an electric stimulator.

The camera module 1080 may capture a still image or moving images. According to an embodiment, the camera module 1080 may include one or more lenses, image sensors, image signal processors, or flashes.

The power management module 1088 may manage power supplied to the electronic device 1001. According to an embodiment, the power management module 1088 may be implemented as at least part of, for example, a power management integrated circuit (PMIC).

The battery 1089 may supply power to at least one component of the electronic device 1001. According to an embodiment, the battery 1089 may include, for example, a primary cell which is not rechargeable, a secondary cell which is rechargeable, or a fuel cell.

The communication module 1090 may support establishing a direct (e.g., wired) communication channel or a wireless communication channel between the electronic device 1001 and the external electronic device (e.g., the electronic device 1002, the electronic device 1004, or the server 1008) and performing communication via the established communication channel. The communication module 1090 may include one or more communication processors that are operable independently from the processor 1020 (e.g., the application processor (AP)) and supports a direct (e.g., wired) communication or a wireless communication. According to an embodiment, the communication module 1090 may include a wireless communication module 1092 (e.g., a cellular communication module, a short-range wireless communication module, or a global navigation satellite system (GNSS) communication module) or a wired communication module 1094 (e.g., a local area network (LAN) communication module or a power line communication (PLC) module). A corresponding one of these communication modules may communicate with the external electronic device via the first network 1098 (e.g., a short-range communication network, such as Bluetooth™, wireless-fidelity (Wi-Fi) direct, or infrared data association (IrDA)) or the second network 1099 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1092 may identify and authenticate the electronic device 1001 in a communication network, such as the first network 1098 or the second network 1099, using subscriber information (e.g., international mobile subscriber identity (IMSI)) stored in the subscriber identification module 1096.

The wireless communication module 1092 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1092 may support a high-frequency band (e.g., the mmWave band) to achieve, e.g., a high data transmission rate. The wireless communication module 1092 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1092 may support various requirements specified in the electronic device 1001, an external electronic device (e.g., the electronic device 1004), or a network system (e.g., the second network 1099). According to an embodiment, the wireless communication module 1092 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 1097 may transmit or receive a signal or power to or from the outside (e.g., the external electronic device) of the electronic device 1001. According to an embodiment, the antenna module 1097 may include an antenna including a radiating element including a conductive material or a conductive pattern formed in or on a substrate (e.g., a printed circuit board (PCB)). According to an embodiment, the antenna module 1097 may include a plurality of antennas (e.g., array antennas). In such a case, at least one antenna appropriate for a communication scheme used in the communication network, such as the first network 1098 or the second network 1099, may be selected, for example, by the communication module 1090 (e.g., the wireless communication module 1092) from the plurality of antennas. The signal or the power may then be transmitted or received between the communication module 1090 and the external electronic device via the selected at least one antenna. According to an embodiment, another component (e.g., a radio frequency integrated circuit (RFIC)) other than the radiating element may be additionally formed as part of the antenna module 1097.

According to various embodiments, the antenna module 1097 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1001 and the external electronic device 1004 via the server 1008 coupled with the second network 1099. Each of the electronic devices 1002 or 1004 may be a device of a same type as, or a different type, from the electronic device 1001. According to an embodiment, all or some of operations to be executed at the electronic device 1001 may be executed at one or more of the external electronic devices 1002, 1004, or 1008. For example, if the electronic device 1001 should perform a function or a service automatically, or in response to a request from a user or another device, the electronic device 1001, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1001. The electronic device 1001 may provide the outcome, with or without further processing of the outcome, as at least part of a reply to the request. To that end, a cloud computing, distributed computing, mobile edge computing (MEC), or client-server computing technology may be used, for example. The electronic device 1001 may provide ultra low-latency services using, e.g., distributed computing or mobile edge computing. In an embodiment, the external electronic device 1004 may include an internet-of-things (IoT) device. The server 1008 may be an intelligent server using machine learning and/or a neural network. According to an embodiment, the external electronic device 1004 or the server 1008 may be included in the second network 1099. The electronic device 1001 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1040) including one or more instructions that are stored in a storage medium (e.g., internal memory 1036 or external memory 1038) that is readable by a machine (e.g., the electronic device 1001). For example, a processor (e.g., the processor 1020) of the machine (e.g., the electronic device 1001) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

An electronic device according to various example embodiments may include: a housing, a display, a camera sensor, a wireless communication circuit, and at least one processor, comprising processing circuitry, electrically connected to the display, the camera sensor, and the wireless communication circuit. At least one processor, individually and/or collectively, may be configured to control the electronic device to: recognize a first object and a second object through at least one of the camera sensor and the wireless communication circuit, determine a first coordinate value on the display corresponding to the first object, and a second coordinate value on the display corresponding to the second object, determine a first region of the display, based on the first coordinate value, determine a second region of the display, based on the second coordinate value, output a first content corresponding to the first object on the first region, output a second content corresponding to the second object on the second region, and based on a distance between the first coordinate value and the second coordinate value being within a specified range, arrange the first content and the second content in a vertical direction of the display.

At least one processor of an example embodiment may individually, and/or collectively, be configured to control the electronic device to: identify the movement of the first object and the movement of the second object through the camera sensor, update the first coordinate value in response to the movement of the first object, and update the second coordinate value in response to movement of the second object.

At least one processor of an example embodiment may individually and/or collectively, be configured to control the electronic device to: determine the first region wherein the first coordinate value corresponds to the center of gravity value of the first region, and determine the second region wherein the second coordinate value corresponds to the center of gravity value of the second region.

The specified range of an example embodiment may include a distance between the first coordinate value and the second coordinate value when at least a portion of the first content is overlapped with the second content on the display.

The electronic device of an example embodiment may further include: a distance detection sensor, and at least one processor, individually and/or collectively, may be configured to: determine a first distance value for the first object from the distance detection sensor and a second distance value for the second object from the distance detection sensor through the distance detection sensor, when the distance between the first coordinate value and the second coordinate value is within the specified range, and arrange one content among the first content and the second content in an upper direction of the display, based on the first distance value and the second distance value, and arrange the remaining one content in a lower direction of the display.

At least one processor of an example embodiment may, individually and/or collectively, be configured to: control the display to display the first content above the second content, based on the first distance value being greater than the second distance value.

The camera sensor of an embodiment may include at least one of an RGB sensor and a dynamic vision sensor (DVS).

The distance detection sensor of an embodiment may include at least one of a millimeter wave radar (mmWave radar), a light detection and ranging (LiDAR) sensor, and a direct time of flight (dToF) sensor.

The wireless communication circuit of an embodiment may be configured to transmit and receive beacon signals.

At least one processor of an example embodiment may, individually and/or collectively, be configured to: predict an intersection point of the first object and the second object, based on a speed of the first object, a speed of the second object, and a distance between the first object and the second object, through the camera sensor, and determine the specified range, based on the intersection point of the first object and the second object.

At least one processor of an example embodiment may, individually and/or collectively, be configured to: control the display wherein a height at which the first region is displayed and a height at which the second region is displayed are gradually changed as the distance between the first coordinate value and the second coordinate value is changed.

At least one processor of an embodiment may, individually and/or collectively, be configured to control the electronic device to: receive first information of a first external electronic device from the first external electronic device through the wireless communication circuit, receive second information of a second external electronic device from the second external electronic device through the wireless communication circuit, and recognize the first object and the second object, based on the first information and the second information.

At least one processor of an example embodiment may, individually and/or collectively, be configured to: determine the first content, based on the first information of the first external electronic device, and determine the second content, based on the second information of the second external electronic device.

The first information of an example embodiment may include unique information of the first external electronic device, user information of the first external electronic device, and information about a strength of a signal received from the first external electronic device, and the second information may include unique information of the second external electronic device, user information of the second external electronic device, and information about a strength of a signal received from the second external electronic device.

At least one processor of an example embodiment may, individually and/or collectively, be configured to: identify a distance from the electronic device to the first object, based on the information about the strength of the signal received from the first external electronic device, based on the distance between the first coordinate value and the second coordinate value being within the specified range, identify a distance from the electronic device to the second object, based on the information about the strength of the signal received from the second external electronic device, and arrange a region corresponding to an object that is further away from the electronic device, among the first region and the second region, in an upper direction of the display.

At least one processor of an example embodiment may, individually and/or collectively, be configured to: set a boundary line in a screen region of the display, determine one region as the first region of the display, based on the boundary line, based on the first coordinate value, and determine the remaining one region as the second region of the display, based on the boundary line, based on the second coordinate value, and an angle formed between the boundary line and a horizontal axis of the display may be changed and reset as the distance between the first coordinate value and the second coordinate value is changed.

A method of operating an electronic device including a display and a camera sensor of various example embodiments may include: recognizing a first object and a second object through the camera sensor, determining a first coordinate value on the display corresponding to the first object and a second coordinate value on the display corresponding to the second object, determining a first region of the display, based on the first coordinate value, determining a second region of the display, based on the second coordinate value, outputting a first content corresponding to the first object on the first region, outputting a second content corresponding to the second object on the second region, and based on the distance between the first coordinate value and the second coordinate value being within a specified range, arranging the first content and the second content in a vertical direction of the display.

An example embodiment may include: acquiring a speed of the first object, a speed of the second object, and a distance value between the first object and the second object, through the camera sensor, predicting an intersection point of the first object and the second object, based on the speed of the first object, the speed of the second object, and the distance value between the first object and the second object, through the camera sensor, and determining the specified range, based on the intersection point of the first object and the second object.

An electronic device of various example embodiments may include: a housing, a plurality of displays, a camera sensor, and at least one processor, comprising processing circuitry, electrically connected to the plurality of displays and the camera sensor. At least one processor may, individually and/or collectively, be configured to control the electronic device to: recognize a first object and a second object through the camera sensor, determine a first coordinate value on the plurality of displays corresponding to the first object, and a second coordinate value on the plurality of displays corresponding to the second object, determine a first display for outputting a first content corresponding to the first object among the plurality of displays, based on the first coordinate value, determine a second display for outputting a second content corresponding to the second object among the plurality of displays, based on the second coordinate value, and based on the first display and the second display being the same display, arrange and output the first content and the second content in a vertical direction on the determined display.

The electronic device of an example embodiment may further include a distance detection sensor, and at least one processor may, individually and/or collectively, be configured to: determine a first distance value for the first object from the distance detection sensor and a second distance value for the second object from the distance detection sensor through the distance detection sensor, based on the first display and the second display being the same, and arrange one content among the first content and the second content in an upper direction of the determined display, based on the first distance value and the second distance value, and arrange the remaining one content in a lower direction of the determined display.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
a display;
at least one sensor;
at least one processor, comprising processing circuitry; and,
memory storing instructions that, when executed by the processor, cause the electronic device to:
recognize a first object and a second object through at least one sensor;
determine a first coordinate value on the display corresponding to the first object, and a second coordinate value on the display corresponding to the second object;
determine a first region of the display, based on the first coordinate value;
determine a second region of the display, based on the second coordinate value;
output a first content corresponding to the first object on the first region;
output a second content corresponding to the second object on the second region; and
based on a distance between the first coordinate value and the second coordinate value being within a specified range
determine a first distance value for the first object from the at least one sensor and a second distance value for the second object from the at least one sensor through the at least one sensor;
based on a determination that the first distance value is larger than the second distance value, arrange the first content on the display; and
based on a determination that the first distance value is smaller than the second distance value, arrange the second content above the first content on the display.

2. The electronic device of claim 1, wherein the instructions, when executed by the processor further cause the electronic device to:
identify the movement of the first object and the movement of the second object through the at least one sensor;
update the first coordinate value in response to the movement of the first object; and
update the second coordinate value in response to movement of the second object.

3. The electronic device of claim 1, wherein the instructions, when executed by the processor further cause the electronic device to:
determine the first region wherein the first coordinate value corresponds to the center of gravity value of the first region, and
determine the second region wherein the second coordinate value corresponds to the center of gravity value of the second region.

4. The electronic device of claim 2, wherein the specified range comprises a distance between the first coordinate value and the second coordinate value based on at least a portion of the first content overlapping the second content on the display.

5. The electronic device of claim 1, wherein the at least one sensor comprises at least one of an RGB sensor and a dynamic vision sensor (DVS).

6. The electronic device of claim 1, wherein the distance detection sensor comprises at least one of a millimeter wave radar (mmWave radar), a light detection and ranging (LiDAR) sensor, and a direct time of flight (dToF) sensor.

7. The electronic device of claim 1, further comprising a wireless communication circuit, and wherein the wireless communication circuit is configured to transmit and receive beacon signals.

8. The electronic device of claim 1, wherein the instructions, when executed by the processor further cause the electronic device to:
predict an intersection point of the first object and the second object, based on a speed of the first object, a speed of the second object, and a distance between the first object and the second object, through the at least one sensor; and
determine the specified range, based on the intersection point of the first object and the second object.

9. The electronic device of claim 1, wherein the instructions, when executed by the processor further cause the electronic device to control the display wherein a height at which the first region is displayed and a height at which the second region is displayed are gradually changed as the distance between the first coordinate value and the second coordinate value is changed.

10. The electronic device of claim 1, further comprising a wireless communication circuit, and wherein the instructions, when executed by the processor further cause the electronic device to:
receive first information of a first external electronic device from the first external electronic device through the wireless communication circuit;
receive second information of a second external electronic device from the second external electronic device through the wireless communication circuit; and
recognize the first object and the second object, based on the first information and the second information.

11. The electronic device of claim 10, wherein the instructions, when executed by the processor further cause the electronic device to: determine the first content, based on the first information of the first external electronic device, and determine the second content, based on the second information of the second external electronic device.

12. The electronic device of claim 10, wherein the first information comprises unique information of the first external electronic device, user information of the first external electronic device, and information about a strength of a signal received from the first external electronic device, and
the second information comprises unique information of the second external electronic device, user information of the second external electronic device, and information about a strength of a signal received from the second external electronic device.

13. The electronic device of claim 12, wherein the instructions, when executed by the processor further cause the electronic device to:
identify a distance from the electronic device to the first object, based on the information about the strength of the signal received from the first external electronic device, based on the distance between the first coordinate value and the second coordinate value being within the specified range;
identify a distance from the electronic device to the second object, based on the information about the strength of the signal received from the second external electronic device; and
arrange a region corresponding to an object further away from the electronic device, among the first region and the second region, in an upper direction of the display.

14. The electronic device of claim 1, wherein the instructions, when executed by the processor further cause the electronic device to:
establish a boundary line on a screen area of the display;
determine, based on the first coordinate value, a region as the first region of the display based on the boundary line; and
determine, based on the second coordinate value, a remaining region as the second region of the display based on the boundary line,
wherein the angle that the boundary line forms with a horizontal axis of the display changes and is reset as the distance between the first coordinate value and the second coordinate value changes.

15. A method of operating an electronic device comprising a display and at least one sensor, the method comprising:
recognizing a first object and a second object through the at least one sensor;
determining a first coordinate value on the display corresponding to the first object, and a second coordinate value on the display corresponding to the second object;
determining a first region of the display, based on the first coordinate value;
determining a second region of the display, based on the second coordinate value;
outputting a first content corresponding to the first object to the first region;
outputting a second content corresponding to the second object on the second region; and
based on a distance between the first coordinate value and the second coordinate value being within a specified range
determining a first distance value for the first object from the at least one sensor and a second distance value for the second object from the at least one sensor through the at least one sensor;
based on a determination that the first distance value is larger than the second distance value, arranging the first content on the display; and
based on a determination that the first distance value is smaller than the second distance value, arranging the second content above the first content on the display.

16. The method of claim 15, further comprising:
the action of obtaining, using the sensor, a velocity of the first object, a velocity of the second object, and a distance value between the first object and the second object;
predicting an intersection point of the first object and the second object, based on a speed of the first object, a speed of the second object, and a distance between the first object and the second object, through the sensor; and
determining the specified range, based on the intersection point of the first object and the second object.

17. An electronic device comprising:
a plurality of displays comprising a first display and a second display above the first display;
at least one sensor;
at least one processor, comprising processing circuitry; and,
memory storing instructions that, when executed by the processor, cause the electronic device to:
recognize a first object and a second object through the at least one sensor,
determine a first coordinate value on the plurality of displays corresponding to the first object, and a second coordinate value on the plurality of displays corresponding to the second object;
determine a first display for outputting first content corresponding to the first object among the plurality of displays, based on the first coordinate value; and
determine a second display for outputting second content corresponding to the second object among the plurality of displays, based on the second coordinate value,
determine a first distance value for the first object from the at least one sensor and a second distance value for the second object from the at least one sensor through the at least one sensor;
based on a determination that the first distance value is larger than the second distance value, arrange the first content on the display; and
based on a determination that the first distance value is smaller than the second distance value, arrange the second content above the first content on the display.

* * * * *